United States Patent
Schnell

(10) Patent No.: US 10,162,779 B2
(45) Date of Patent: Dec. 25, 2018

(54) INCREASING DATA THROUGHPUT OF A UNIVERSAL SERIAL BUS (USB) TYPE-C PORT

(71) Applicant: Dell Products L. P., Round Rock, TX (US)

(72) Inventor: Arnold Thomas Schnell, Hutto, TX (US)

(73) Assignee: Dell Products L.P., Round Rock, TX (US)

(*) Notice: Subject to any disclaimer, the term of this patent is extended or adjusted under 35 U.S.C. 154(b) by 192 days.

(21) Appl. No.: 15/281,887

(22) Filed: Sep. 30, 2016

(65) Prior Publication Data

US 2017/0017595 A1 Jan. 19, 2017

Related U.S. Application Data

(63) Continuation-in-part of application No. 14/708,420, filed on May 11, 2015, now Pat. No. 9,858,237.

(51) Int. Cl.
G06F 13/38 (2006.01)
G06F 13/42 (2006.01)
G06F 13/40 (2006.01)

(52) U.S. Cl.
CPC ........ *G06F 13/385* (2013.01); *G06F 13/4022* (2013.01); *G06F 13/4282* (2013.01); *G06F 13/4286* (2013.01); *G06F 2213/0026* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 9,100,294 B2* | 8/2015 | Balasubramanian | ........................ H04L 41/0803 | |
| 2012/0229076 A1* | 9/2012 | Zhu | .......................... H04L 25/02 320/107 | |
| 2012/0314777 A1* | 12/2012 | Zhang | .............. H04N 21/43632 375/240.26 | |
| 2015/0331826 A1* | 11/2015 | Ghosh | ................. G06F 13/4022 710/313 | |
| 2016/0191313 A1* | 6/2016 | Chen | ................... H04L 41/0816 370/315 | |
| 2016/0259005 A1* | 9/2016 | Menon | ............... G01R 31/3177 | |

* cited by examiner

*Primary Examiner* — Henry Tsai
*Assistant Examiner* — Christopher A Bartels
(74) *Attorney, Agent, or Firm* — Campbell Stephenson LLP; Shiv S. Naimpally

(57) ABSTRACT

A computing device may include a universal serial bus (USB) port, a port controller, and a first port multiplexer. The port controller may determine that a connector of a cable has been connected to the port of the computing device and determine that the cable includes a second port multiplexer. The port controller may send a first instruction to the first port multiplexer to select a single-ended signaling configuration and send a second instruction to the second port multiplexer to select the single-ended signaling configuration. In the single-ended configuration, the first port multiplexer may receive a set of differential signals, convert the set of differential signals to a corresponding set of single-ended signals, and output the set of single-ended signals to the port.

20 Claims, 24 Drawing Sheets

Y=CONNECTION USED FOR NORMAL ORIENTATION
F=CONNECTION USED FOR FLIPPED ORIENTATION
<BLANK>=NO CONNECTION

| INPUTS | O0 | O1 | O2 | O3 | O4 | O5 | O6 | O7 | O8 | O9 | O10 | O11 | O12 | O13 |
|---|---|---|---|---|---|---|---|---|---|---|---|---|---|---|
| A0 | Y | | | | | | | | | | | | | |
| A1 | | Y | F | F | F | | | | | | | | | |
| A2 | | F | Y | | | | | | | | | | | |
| A3 | F | | | Y | Y | | | | | | | | | |
| B0 | | | | | | Y | | | | | | | | |
| B1 | | | | | | | Y | F | | | | | | |
| B2 | | | | | | | YF | YF | | | | | | |
| B3 | | | | | | F | | | Y | | | | | |
| B4 | | | | | | | F | YF | | Y | | | | |
| B5 | | | | | | | | | F | | Y | F | F | |
| B6 | | | | | | | | | | F | F | Y | | |
| B7 | | | | | | | F | Y | | | | | | |
| B8 | | | | | Y | | | | | | | | Y | |
| B9 | | | | | | | | | | | | | | Y |

FIG. 4B

Y=CONNECTION USED FOR NORMAL ORIENTATION
F=CONNECTION USED FOR FLIPPED ORIENTATION
<BLANK>=NO CONNECTION

| INPUTS | O0 | O1 | O2 | O3 | O4 | O5 | O6 | O7 | O8 | O9 | O10 | O11 | O12 | O13 |
|---|---|---|---|---|---|---|---|---|---|---|---|---|---|---|
| A0 | Y | | | F | | | | | | | | | | |
| A1 | | Y | F | | | | | | | | | | | |
| A2 | | F | Y | | | | | | | | | | | |
| A3 | F | | | Y | Y | | | | | | | | | |
| B0 | | | | | | Y | | | F | | | | | |
| B1 | | | | | | | Y | F | | | | | | |
| B2 | | | | | | | YF | YF | | | | | | |
| B3 | | | | | | F | | | Y | | | | | |
| B4 | | | | | | | F | YF | | | | | | |
| B5 | | | | | | | | | | Y | | | F | |
| B6 | | | | | | | | | | | Y | F | | |
| B7 | | | | | | | | Y | | F | F | Y | Y | |
| B8 | | | | | | | F | Y | | | | | | |
| B9 | | | | | Y | | | | | | | | | Y |

FIG. 5A-2

| INPUTS | O0 | O1 | O2 | O3 | O4 | O5 | O6 | O7 | O8 | O9 | O10 | O11 | O12 | O13 |
|---|---|---|---|---|---|---|---|---|---|---|---|---|---|---|
| A0 | Y | | | | | | | | | | | | | |
| A1 | | Y | | | | | | | | | | | | |
| A2 | | | Y | | | | | | | | | | | |
| A3 | | | | Y | Y | | | | | | | | | |
| B0 | | | | | | Y | | | | | Y | | | |
| B1 | | | | | | | Y | | | | | | | |
| B2 | | | | | | | Y | Y | | | | | | |
| B3 | | | | | | | | | Y | | | | | |
| B4 | | | | | | | | Y | | Y | | | | |
| B5 | | | | | | | | | | | Y | | | |
| B6 | | | | | | | | Y | | | | Y | | |
| B7 | | | | | Y | | | | | | | | | |
| B8 | | | | | | | | | | | | | Y | |
| B9 | | | | | | | | | | | | | | Y |

Y=CONNECTION USED OR NORMAL ORIENTATION
=CONNECTION USED OR LIPPED ORIENTATION
<BLANK>=NO CONNECTION

FIG. 5B-2

| | Y=CONNECTION USED FOR NORMAL ORIENTATION |
|---|---|
| | F=CONNECTION USED FOR FLIPPED ORIENTATION |
| | <BLANK>=NO CONNECTION |

| INPUTS | O0 | O1 | O2 | O3 | O4 | O5 | O6 | O7 | O8 | O9 | O10 | O11 | O12 | O13 |
|---|---|---|---|---|---|---|---|---|---|---|---|---|---|---|
| A0 | Y |  |  |  |  |  |  |  |  |  |  |  |  |  |
| A1 |  | Y | F |  |  |  |  |  |  |  |  |  |  |  |
| A2 |  | F | Y |  |  |  |  |  |  |  |  |  |  |  |
| A3 | F |  |  | Y | F→Y |  |  |  |  |  |  |  |  |  |
| B0 |  |  |  |  |  | Y |  |  | F |  |  |  |  |  |
| B1 |  |  |  |  |  |  | Y | F |  |  |  |  |  |  |
| B2 |  |  |  |  |  |  | YF | YF |  |  |  |  |  |  |
| B3 |  |  |  |  |  | F |  |  | Y |  |  |  |  |  |
| B4 |  |  |  |  |  |  | F | YF |  | Y |  |  |  |  |
| B5 |  |  |  |  |  |  |  |  |  |  | Y | F |  |  |
| B6 |  |  |  |  |  |  |  |  |  | F | Y |  | F |  |
| B7 |  |  |  |  |  |  | F→Y |  |  |  |  | F | Y |  |
| B8 |  |  |  |  |  |  |  |  |  |  |  |  |  | Y |
| B9 |  |  |  |  | Y |  |  |  |  |  |  |  |  |  |

FIG. 6B

| INPUTS | O0 | O1 | O2 | O3 | O4 | O5 | O6 | O7 | O8 | O9 | O10 | O11 | O12 | O13 |
|---|---|---|---|---|---|---|---|---|---|---|---|---|---|---|
| A0 | Y | | | | | | | | | | | | | |
| A1 | | Y | F | F | | | | | | | | | | |
| A2 | | F | Y | | | | | | | | | | | |
| A3 | F | | | Y | Y | | | | | | | | | |
| B0 | | | | | | Y | | | F | | | | | |
| B1 | | | | | | | Y → F | | | | | | | |
| B2 | | | | | | | YF ← YF | | | | | | | |
| B3 | | | | | F | | | | Y | | | | | |
| B4 | | | | | | | F | YF | | | | | | |
| B5 | | | | | | | | | | Y | Y | F | | |
| B6 | | | | | | | | | | F | F | F | F | |
| B7 | | | | | | | F | Y | | | | Y | Y | |
| B8 | | | | | Y | | | | | | | | | |
| B9 | | | | | | | | | | | | | | Y |

Y = CONNECTION USED FOR NORMAL ORIENTATION
F = CONNECTION USED FOR FLIPPED ORIENTATION
<BLANK> = NO CONNECTION

FIG. 7B

Y=CONNECTION USED FOR NORMAL ORIENTATION
F=CONNECTION USED FOR FLIPPED ORIENTATION
<BLANK>=NO CONNECTION

| INPUTS | O0 | O1 | O2 | O3 | O4 | O5 | O6 | O7 | O8 | O9 | O10 | O11 | O12 | O13 |
|---|---|---|---|---|---|---|---|---|---|---|---|---|---|---|
| A0 | Y |   |   |   | F |   |   |   |   |   |   |   |   |   |
| A1 |   | Y | F |   |   |   |   |   |   |   |   |   |   |   |
| A2 |   | F | Y | F |   |   |   |   |   |   |   |   |   |   |
| A3 | F |   |   | Y |   |   |   |   |   |   |   |   |   |   |
| B0 |   |   |   |   |   | Y | Y | F | F |   |   |   |   |   |
| B1 |   |   |   |   |   |   | YF | YF |   |   |   | F |   |   |
| B2 |   |   |   |   |   | F | YF | YF |   |   |   |   |   |   |
| B3 |   |   |   |   |   |   |   |   | Y |   |   |   |   |   |
| B4 |   |   |   |   |   |   | F | YF |   |   | Y |   |   |   |
| B5 |   |   |   |   |   |   |   |   |   | Y | Y | F |   |   |
| B6 |   |   |   |   |   |   |   |   |   | F | F | Y |   |   |
| B7 |   |   |   |   |   |   | F | Y |   |   |   |   | Y |   |
| B8 |   |   |   |   |   |   |   |   |   |   |   |   | F | Y |
| B9 |   |   |   |   | Y |   |   |   |   |   |   |   |   |   |

FIG. 8A-2

| INPUTS | O0 | O1 | O2 | O3 | O4 | O5 | O6 | O7 | O8 | O9 | O10 | O11 | O12 | O13 |
|---|---|---|---|---|---|---|---|---|---|---|---|---|---|---|
| A0 | Y | | | | | | | | | | | | | |
| A1 | | Y | | | | | | | | | | | | |
| A2 | | | Y | | | | | | | | | | | |
| A3 | | | | Y | Y | | | | | | | | | |
| B0 | | | | | | Y | | | | | | | | |
| B1 | | | | | | | Y | | | | | | | |
| B2 | | | | | | | Y | Y | | | | | | |
| B3 | | | | | | | | | Y | | | | | |
| B4 | | | | | | | | Y | | Y | | | | |
| B5 | | | | | | | | | | Y | Y | | | |
| B6 | | | | | | | | | | | | Y | | |
| B7 | | | | | | | | Y | | | | | | |
| B8 | | | | | Y | | | | | | | | Y | |
| B9 | | | | | | | | | | | | | | Y |

Y=CONNECTION USED OR NORMAL ORIENTATION
=CONNECTION USED OR LIPPED ORIENTATION
<BLANK>=NO CONNECTION

FIG. 8B-2

Y=CONNECTION USED FOR NORMAL ORIENTATION
F=CONNECTION USED FOR FLIPPED ORIENTATION

| INPUTS | O0 | O1 | O2 | O3 | O4 | O5 | O6 | O7 | O8 | O9 | O10 | O11 | O12 | O13 |
|---|---|---|---|---|---|---|---|---|---|---|---|---|---|---|
| A0 | Y | | | | | | | | | | | | | |
| A1 | | Y→ | F | ↑F | | | | | | | | | | |
| A2 | | F | Y | | | | | | | | | | | |
| A3 | ↓F | | | Y | Y | | | | | | | | | |
| B0 | | | | | | Y | | | | | | | | |
| B1 | | | | | | | Y | ↑F | | | | | | |
| B2 | | | | | | F | YF→ | YF | | | | | | |
| B3 | | | | | | | | F→ | YF | | | | | | |
| B4 | | | | | | | | | F | Y | Y→ | ↓F | | |
| B5 | | | | | | | | | Y | | | F | | |
| B6 | | | | | | | F | | | F | Y | F | F | |
| B7 | | | | | | | | Y | | | ↓F | Y | Y | |
| B8 | | | | | Y | | | | | | | | Y | Y |
| B9 | | | | | | | | | | | | | | |

FIG. 9A-2

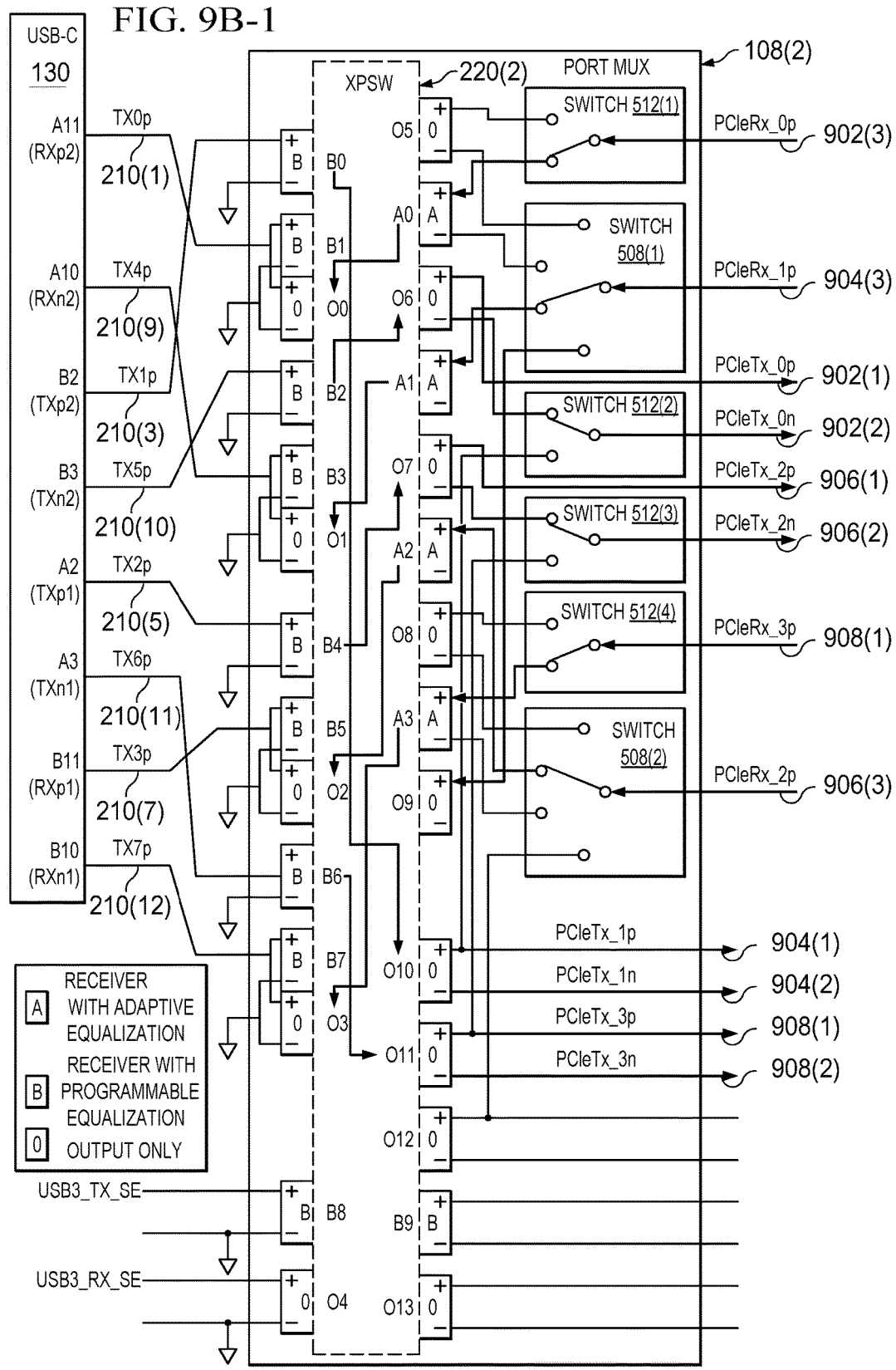

Y=CONNECTION USED OR NORMAL ORIENTATION
=CONNECTION USED OR LIPPED ORIENTATION

| INPUTS | O0 | O1 | O2 | O3 | O4 | O5 | O6 | O7 | O8 | O9 | O10 | O11 | O12 | O13 |
|---|---|---|---|---|---|---|---|---|---|---|---|---|---|---|
| A0 | Y | | | | | | | | | | | | | |
| A1 | | Y | | | | | | | | | | | | |
| A2 | | | Y | | | | | | | | | | | |
| A3 | | | | Y | | | | | | | | | | |
| B0 | | | | | Y | Y | | | | | | | | |
| B1 | | | | | | | Y | | | | | | | |
| B2 | | | | | | | Y | Y | | | | | | |
| B3 | | | | | | | | | Y | | | | | |
| B4 | | | | | | | | Y | | Y | | | | |
| B5 | | | | | | | | | | | Y | | | |
| B6 | | | | | | | | | | | Y | | | |
| B7 | | | | | | | | Y | | | | Y | | |
| B8 | | | | | Y | | | | | | | | Y | |
| B9 | | | | | | | | | | | | | | Y |

FIG. 9B-2

INCREASING DATA THROUGHPUT OF A UNIVERSAL SERIAL BUS (USB) TYPE-C PORT

CROSS-REFERENCE TO RELATED APPLICATIONS

The present patent application is a continuation-in-part of U.S. patent application Ser. No. 14/708,420, filed on May 11, 2015, entitled "Information Handling System Differential Signaling Variable Bandwidth Interface" and is incorporated by reference herein in its entirety and for all purposes as if completely and fully set forth herein.

BACKGROUND OF THE INVENTION

Field of the Invention

This invention relates generally to Universal Serial Bus (USB) Type-C ports and, more particularly, to increasing data throughput for a USB Type-C port of a computing device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A dock may be connected to a computing device (e.g., an information handling system) to provide additional ports, such as, for example, one or more of a video port, an audio port, a data port, or another type of input/output (I/O) port. In some cases, the dock may be attached to the computing device via a USB port, such as USB type-A ("USB-A"). In other cases, to increase throughput compared to USB-A, the dock may be attached to the computing device using a proprietary connector, such as a Dell® E-connector (a bottom mount interface).

As computing devices adopt the use of USB Type-C ("USB-C") ports, users may desire to connect a dock via a USB-C port. However, USB-C has several limitations, such as expense and a limited number of lanes for carrying traffic. For example, a dock may use Multi-Function DisplayPort (MFDP) mode to provide a USB3 (USB 3.1 or higher compliant) channel and two lanes of DisplayPort (DP). This type of capability is suited for entry-level users that want to dock relatively low (e.g., 1920×1080 pixels or lower) resolution monitors. For medium-level performance users, a Thunderbolt™ port providing 40 gigabits per second (Gbps) may be used to provide a dock supporting two 4K (e.g., 3840×2160 pixels or greater) resolution monitors along with additional USB devices. However, using a Thunderbolt™-based dock is relatively expensive. A first Thunderbolt™ chip in the computing device provides a protocol tunneling service for protocols such as DP, USB, and Peripheral Component Interconnect Express (PCIe). Because the signal is transmitted 20 Gbps, a second Thunderbolt™ chip in cable is used to re-drive the signal to support a cable length of 1 meter. A third Thunderbolt™ chip in the dock converts the Thunderbolt™ signaling back to the original protocols (e.g., DP, USB, and PCIe). Thus, three Thunderbolt™ chips are required for a dock resulting in relatively expensive solution.

In addition, USB-C has a limited amount of throughput because a maximum of four different signals are possible over four differential pairs. For example, for high-level performance users, a USB-C docking solution that provides relatively high resolution (e.g., 5K and 8K) monitors and relatively high refresh rates is currently unavailable. Applications, such as virtual reality, may use 4K resolution with 120 Hz refresh rate (×2 for two eyes). However, the bandwidth to support such applications is beyond the capability of a USB-C or Thunderbolt™-3 interface using current signaling schemes.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

A computing device may include a universal serial bus (USB) port, a port controller, and a first port multiplexer. The port controller may determine that a connector of a cable has been connected to the port of the computing device and determine that the cable includes a second port multiplexer. The port controller may send a first instruction to the first port multiplexer to select a single-ended signaling configuration and send a second instruction to the second port multiplexer to select the single-ended signaling configuration. In the single-ended configuration, the first port multiplexer may receive a set of differential signals and output a set of single-ended signals that are derived from the set of differential signals.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 4B is a block diagram illustrating connections to a crosspoint switch according to some embodiments.

FIG. 5A-1 is a block diagram illustrating a configuration of a computing device's port mux and crosspoint switch to provide increased throughput according to some embodiments.

FIG. 5A-2 is a diagram illustrating connections in the crosspoint switch of FIG. 5A-1 according to some embodiments.

FIG. 5B-1 is a block diagram illustrating a configuration of a cable's port mux and crosspoint switch to provide increased throughput according to some embodiments.

FIG. 5B-2 is a diagram illustrating connections in the crosspoint switch of FIG. 5B-1 according to some embodiments.

FIG. 6B is a diagram illustrating connections in the crosspoint switch of FIG. 6A according to some embodiments.

FIG. 7B is a diagram illustrating connections in the crosspoint switch of FIG. 7A according to some embodiments.

FIG. 8A-1 is a block diagram illustrating a configuration of a computing device's port mux and crosspoint switch to support multi-function display port (MFDP) according to some embodiments.

FIG. 8A-2 is a diagram illustrating connections in the crosspoint switch of FIG. 8A-1 according to some embodiments.

FIG. 8B-1 is a block diagram illustrating a configuration of a cable's port mux and crosspoint switch to support MFDP according to some embodiments.

FIG. 8B-2 is a diagram illustrating connections in the crosspoint switch of FIG. 8B-1 according to some embodiments.

FIG. 9A-1 is a block diagram illustrating a configuration of a computing device's port mux and crosspoint switch to provide four lanes of Peripheral Component Interconnect Express (PCIe) according to some embodiments.

FIG. 9A-2 is a diagram illustrating connections in the crosspoint switch of FIG. 9A-1 according to some embodiments.

FIG. 9B-1 is a block diagram illustrating a configuration of a cable's port mux and crosspoint switch to provide four lanes of PCIe according to some embodiments.

FIG. 9B-2 is a diagram illustrating connections in the crosspoint switch of FIG. 9B-1 according to some embodiments.

DETAILED DESCRIPTION

Figure 1:
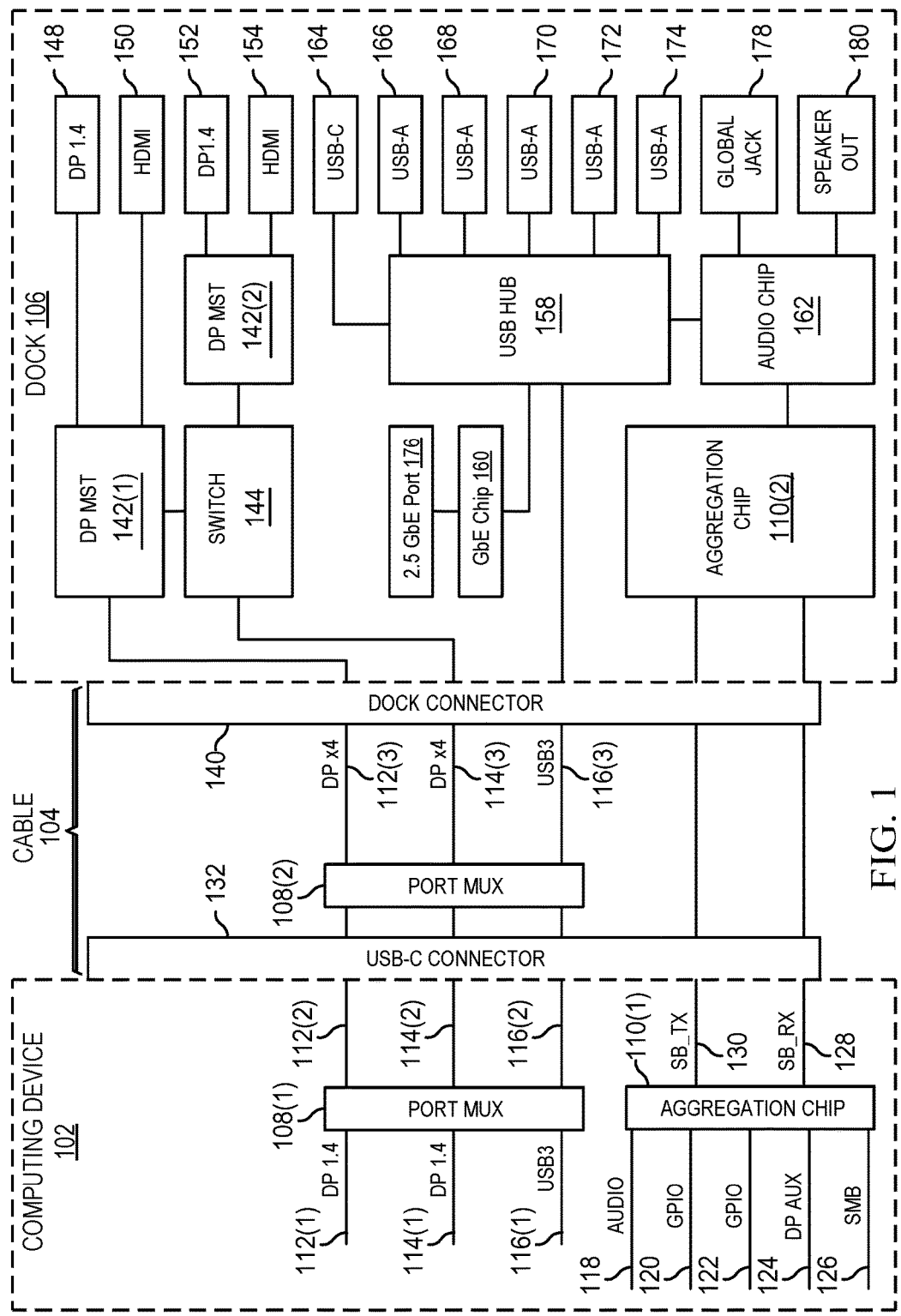
FIG. 1 is a block diagram illustrating a computing system in which a dock is connected to a computing device via a cable according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The USB-C specification describes a 24-pin double-sided connector that provides four power-ground pairs, two differential pairs for non-SuperSpeed data (though only one pair is populated in a USB Type-C cable), four differential pairs for a high-speed data bus, two pins for sideband use, and two configuration pins for cable orientation detection, a dedicated configuration data channel, and VCONN +5 V power for active cables. When connecting a cable to a USB-C port, the cable's connector may be inserted into a USB-C port without regard to the orientation of the connector because a port controller associated with the USB-C port uses the configuration pins to determine the cable orientation. The high-speed data bus uses differential signaling in which the same electrical signal is sent as a pair of signals, e.g., a first signal having a positive polarity is sent over a first conductor (e.g., wire of the cable) and a second signal having a negative polarity is sent over a second conductor. The receiving device determines the electrical difference between the two signals, rather than the difference between a single wire and ground. The advantages of using differential pairs instead of a single wire and ground include (1) noise rejection, (2) reduced signal loss, particularly over a long distance (e.g., a cable between a computing device and a dock may experience reduced signal loss) and (3) avoiding grounding issues (e.g., ground loop) because the computing device and the dock each have their own ground. However, the disadvantage of using differential signaling is that each pair of wires are used to carry the same signal, thereby limiting data throughput. With USB-C, using the four differential pairs of the high-speed data bus, the maximum throughput is approximately no more than 40 Gbps.

Using Single-ended Instead of Differential Signaling Doubles Signal Paths

The systems and techniques described herein increase throughput (e.g., bandwidth) between the computing device and the dock by converting the differential signals to single-ended signals prior to sending the signals to the USB-C port and then converting the single-ended signals at a receiving connector (e.g., a circuit in a paddleboard) of the cable to differential signals that travel over the cable to the dock. For example, (1) a first custom port multiplexer (mux) chip that includes a crosspoint switch converts differential pairs of signals in the computing device to single-ended signals (e.g., by selecting the positive signal from each differential pair of signals) that are transmitted through the USB-C port of the computing device, (2) a second port mux chip in the cable (e.g., in the paddleboard of the cable) receives the single-ended signals from the USB-C port and converts the single-ended signals to differential pairs of signals (e.g., generating a negative signal corresponding to each positive single-ended signal) to traverse a longer distance down the cable and transports the differential pairs of signals to the dock's USB-C port where the differential pairs of signals are received from the cable and made available at the various ports of the dock. Thus, the single-ended signals are used to transmit the signals through the USB-C port of the computing device, e.g., the signals travel across a very small distance (as compared to the length of the cable) and the likelihood of noise being introduced in a shielded and grounded computing device is very small. The differential signals are converted to single-ended signals (e.g., by selecting one signal from each differential pair of signal) prior to being transmitted through the USB-C port and, after being received at the end of the cable that is connected to the USB-C port, are converted back to differential signals. In this way, the four differential pairs of pins of the high-speed data bus are used to transmit eight channels of signals (rather than four differential signals), thereby at least doubling throughput using the four differential pairs of the high-speed data bus of the USB-C port. The non-SuperSpeed data differential pair may be used to carry single-ended signals to further increase throughput. Though some of the examples described herein use the example of selecting the positive signal from a differential pair for single-ended signaling, it should be understood that either polarity (e.g., positive or negative) may be selected from each differential pair or a differential receiver circuit may be implemented that uses both positive and negative portions of the differential signal to produce the single-ended signaling.

Thus, converting from differential signaling to single-ended signaling and back to differential signaling may enable ten single-ended signals to be passed through a USB-C port. For example, the ten single-ended signals may include eight DP lanes (e.g., two DP channels with four lanes each), one USB Tx (transmit) signal, and one USB Rx (receive) signal. These ten signals arrive as differential signals at the port mux chip in the computing device. The port mux chip converts the differential signals to single-ended signals. The single-ended signals pass through the USB-C connector to a second port mux chip on the cable paddleboard. For example, up to 100 Gbps of signaling can be passed through the USB-C port using single-ended signaling. The second port mux chip receives the single-ended signals and converts them to differential signals. The differential signals travel down the cable to the dock, where the signals are made available at various I/O ports, such as, for example, two DP channels of four lanes each and a USB3 channel. In this way, throughput using a USB-C connector can be at least doubled because the number of signals that can be passed through the connector are doubled by using single-ended signaling over each pin of the pairs of pins normally used to carry differential pairs of signals. For example, in a normal configuration that uses differential signaling, ten pins of the USB-C connector may be used to carry five differential pairs of signals. In a single-ended configuration, the ten pins may be used to carry ten single-ended signals, thereby doubling throughput (assuming the signaling scheme stays the same).

Enable Single-ended Signaling Using Guest Protocol

The USB Type-C ("USB-C") specification includes support for guest protocols, thereby enabling a wide variety of signals to be transported using USB-C. For example, an alternate mode ("alt mode") may be invoked using manufacturer specific messages (referred to as vendor defined messages (VDM) in the USB-C specification) to enable increased throughput when using a dock and a computing device from the same company. For example, when a Dell® computing device is connected to a Dell® dock using a Dell® cable, the port controller associated with the USB-C port in the computing device and the port controller associated with the USB-C port in the cable may use the communication channel to enable an alternate mode in which differential signals are converted to single-ended signals and passed through the USB-C port before being converted to differential signals and sent over the cable to the dock. When a non-Dell® computing device is connected to a Dell® dock using a Dell® cable or a Dell® computing device is connected to a non-Dell® dock using a Dell® cable, the port controller associated with the USB-C port in the computing device and the port controller associated with the USB-C port in the cable may use the communication channel to determine that the alternate mode cannot be enabled and may provide reduced functionality (e.g., reduced bandwidth supporting slower performing ports on the dock). Computing devices and cables that use USB-C are designed to comply with the USB-C specification, which specifies differential signaling. When USB-C is used in an alternate mode to provide single-ended signaling, the complexity of the signal muxes increases substantially. The systems and techniques described herein are used to manage the complexity of the signal muxes.

In addition to increasing (e.g., at least doubling) the throughput of a USB-C port by using single-ended signaling instead of differential signaling when pushing signals through a USB-C port, using a custom port mux chip results in a significant infrastructure cost reduction. In practice, a 10 Gbps signal can traverse through a 1 meter cable without re-drivers. However, a 20 Gbps signal can traverse approximately half that distance, which means that either (a) a Thunderbolt cable that is 1 meter in length will use a signal re-driver in the middle of the cable or (b) the cable will be substantially shorter than 1 meter in length (which is unacceptable to most customers). Based on the laws of physics, higher frequency signals will likely experience higher signal losses. Therefore, keeping the signaling throughput at 10 Gbps, rather than increasing the signaling (e.g., beyond 10 Gbps) for higher data throughput, results in significantly lower costs. Additionally, current silicon designs (e.g., for a custom port mux chip) can easily support 10 Gbps signaling, while higher signaling rates drive up the costs. Therefore, the cost of a port mux chip that uses 10 Gbps signaling is lower than the cost of a Thunderbolt chip.

Thus, differential signals in a computing device may be converted, using a custom port mux chip, to single-ended signals to increase throughput when passing signals through a USB-C port of the computing device. For example, five differential pairs of pins may be used to transmit ten channels of single-ended signals. A second port mux in a paddleboard of a cable connecting the computing device to a dock may receive the single-ended signals from the USB-C port, convert the single-ended signals to differentials signals, and transport the differential signals to the dock. The dock may receive the differential signals and output them to multiple high speed ports, such as, for example, two DP channels of 4 lanes each and a USB3 port. Compared to using ThunderBolt™, the systems and techniques described herein significantly increase (e.g., more than double) throughput and significantly reduce costs.

FIG. 1 is a block diagram illustrating a computing system in which a dock is connected to a computing device via a cable according to some embodiments. In FIG. 1, a computing device 102 is connected, via a cable 104, to a dock 106.

Custom Port Multiplexer (Mux) Chip

The computing device 102 may include at least two custom chips, e.g., a custom port mux chip 108(1) and a custom aggregation chip 110(1). The port mux 108(1) may include various circuits, including one or more multiplexers and a crosspoint switch. In the computing device 102, the port mux 108(1) may be configured to receive multiple differential signals, such as DP channel A 112(1) (e.g., four lanes of DP), DP channel B 114(1) (e.g., four lanes of DP), and USB3 116(1) (Tx and Rx signals for USB 3), and output them as single-ended signals 112(2), 114(2), and 116(2), respectively. The aggregation chip 110(1) may aggregate multiple signals, such as audio signal 118 (e.g., Inter-IC Sound (I2S)), a first general-purpose input/output (GPIO) signal 120, a second GPIO signal 122, a DP auxiliary signal 124 (e.g. carrying device management and device control data associated with DP), and a system management bus (SMB) signal 126 and send the aggregated signal through USB-C connector 132 using the sideband (SB) transmit (Tx) channel SB_TX 128. An SB receive (Rx) channel SB_RX 130 is used to receive signals aggregated at the dock 106 and separate the signals into the audio signal, a first GPIO signal 120, the second GPIO signal 122, the DP auxiliary signal 124, and the SMB signal 126. The single-ended signals 112(2), 114(2), and 116(2) that are output by the port mux 108(1) are sent through the USB-C connector 132 that connects the computing device 102 and the cable 104.

A port mux 108(2) (e.g., typically located in a paddleboard) of the cable 104 receives the single-ended signals 112(2), 114(2), and 116(2) from the USB-C connector 132. The port mux 108(2) converts the single ended signals 112(2), 114(2), and 116(2) into differential signals 112(3), 114(3), and 116(3), respectively. The differential signals 112(3), 114(3), and 116(3) are transported by the cable 104 to a dock connector 140 that connects the cable 104 to the dock 106.

The dock connector 140 receives the differential signals 112(3), 114(3), and 116(3) and the side band signal SB_TX 130 from the cable 104 and sends them to various internal components for distribution to multiple ports of the dock 106. For example, the four lanes of DP 134 may be sent to a DP multi-stream transport (MST) chip 142(1) and the four lanes of DP may be sent to a DP MST chip 142(2) via a switch 144. The DP MST(1) may be configured to provide either the 4 lanes of DP 134 (e.g., to drive a 4 k monitor) at DP port 148 or to provide a signal to a high-definition multimedia interface (HDMI) port 150. The DP MST(2) may be configured to provide either the 4 lanes of DP 136 (e.g., to drive a 4 k monitor) at DP port 150 or to provide a signal to an HDMI port 150. The switch 144 may be used to control the DP MST chips 142(1) and 142(2). For example, the switch 144 may be used to select between outputting DP or HDMI output, swapping outputs (e.g., to output DP lanes 136 at DP port 148 or HDMI port 150 and output DP lanes 134 at DP port 152 or HDMI port 154), or perform other video signal switching-related functions.

The USB3 differential signal 138 may be received by the dock 106 via the dock connector 140 and sent to a USB hub chip 158 to provide multiple ports, such as, a USB-C port 164, USB Type-A ("USB-A") ports 168, 170, 172, and 174, and a Gigabit Ethernet (GbE) port 176 using a GbE chip 160.

An aggregation chip 110(2) may receive the SB_Tx 130 signal from the aggregation chip 110(1) and may transmit the SB_Rx 128 signal to the aggregation chip 110(1). The aggregation chip 110(2) may separate the SB_Tx 130 signal into one or more component signal streams. An audio chip 162 is connected to the USB hub 158 (e.g., in some cases, audio signal I/O may be provided via USB) and to the aggregation chip 110(2). The audio chip 162 may provide signals to multiple audio ports, such as a global jack 178 and a speaker out 180.

Thus, a port controller chip in a USB-C port of a computing device and a port controller chip in a paddleboard of a cable may identify (e.g., using the USB-C communication channel) the presence of a first port mux in the computing device and a second port mux in the cable. In response, the port controller chips may enable an alternate mode (e.g., using vendor defined messages). In the alternate mode, the first port mux chip in the computing device may be used to convert differential signals (e.g., multiple DP and USB3 differential signals) into single-ended signals that are passed through the USB-C port of the computing device to a USB-C connector of the cable. The second port mux chip in the cable may receive the single-ended signals via the USB-C connector of the cable, convert the single-ended signals to differential (pair) signals, and transport the differential signals to a dock. The dock may receive the differential signals and make them available via multiple ports, such as video ports (e.g., DP or HDMI), USB ports, and audio ports. For example, the video ports on the dock may be capable of driving two 4 k display monitors in addition to multiple USB ports and audio ports. Of course, the dock may offer other high-speed ports. Thus, the cable and the dock may provide at least twice the bandwidth (e.g., as compared to ThunderBolt™) because the alternate mode is capable of significantly increasing (e.g., ten single-ended signals instead of five differential signals) the throughput of the signals passing through the USB-C port. In addition, the cable and dock may provide a significantly cheaper alternative to using a ThunderBolt™-based cable and dock. The internal configuration of the port mux (with the crosspoint switch) for typical docking scenarios are illustrated below.

Dock Capabilities

Figure 2:
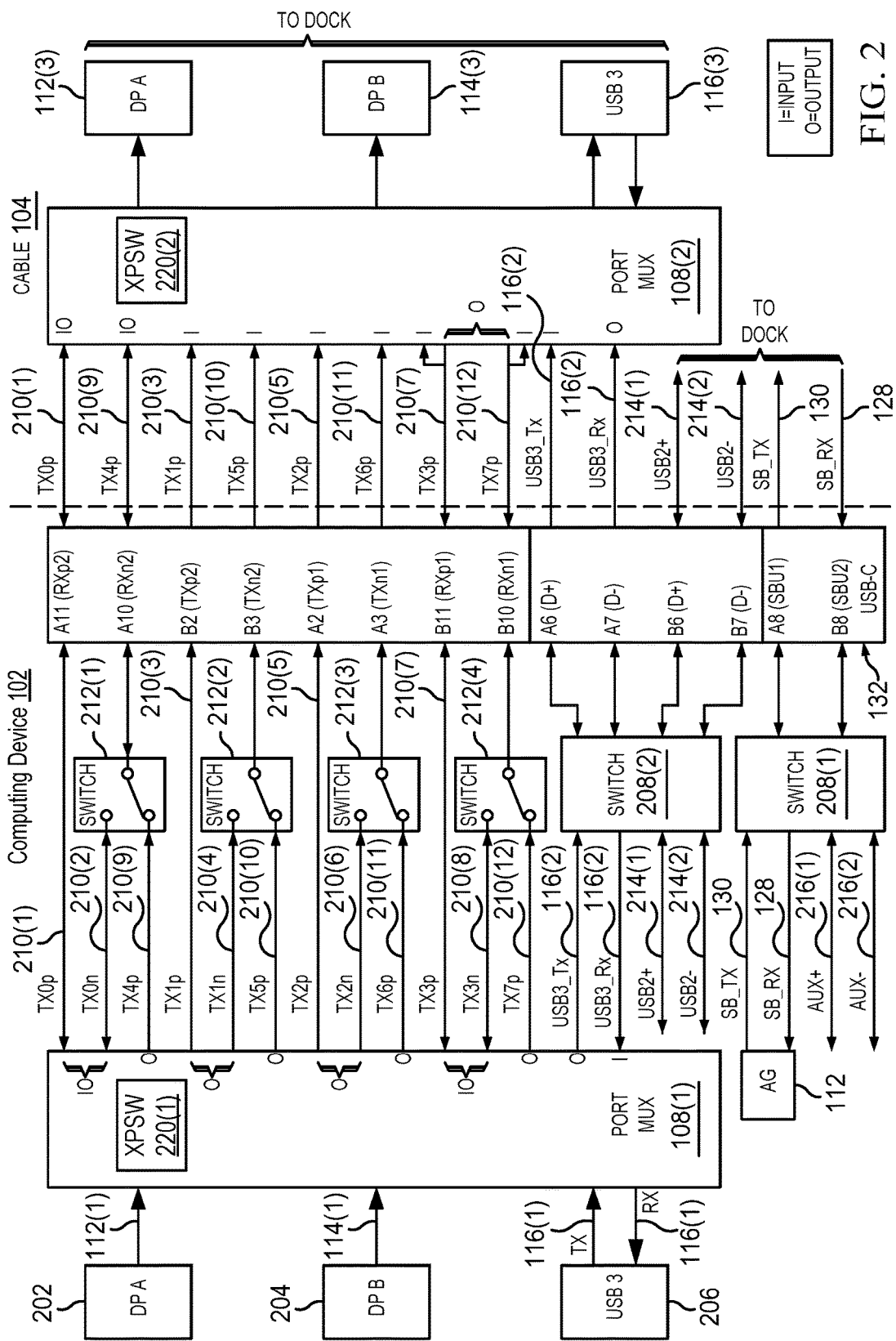
FIG. 2 is a block diagram illustrating a computing system that includes a port multiplexer ("mux") connected to a USB-C port of a computing device according to some embodiments.

FIG. 2 is a block diagram illustrating a computing system that includes a port multiplexer ("mux") connected to a USB-C port of a computing device according to some embodiments. FIG. 2 illustrates how the port mux 108(1) may be configured to support the system illustrated in FIG. 1. The port mux 108(1) may receive differential signals as inputs and select whether to use (e.g., send and/or receive) differential signals or single-ended signals with the USB-C connector 132. The port mux 108(1) may include a crosspoint switch ("XPSW") 220(1) and the port mux 108(2) may include an XPSW 220(2).

A DP source A 202 may provide up to four lanes of DP via the differential signals 112(1). A DP source B 204 may provide up to four lanes of DP via the differential signals 114(1). A USB 3 compliant chip 206 may transmit USB3 signal Tx 116(1) and receive USB3 signal Rx 116(1) (e.g., the transmit and receive components of USB3 116(1) of FIG. 1).

Signals having the same label and ending in n (negative) and p (positive) represent a differential pair of signals. For example, Tx0p 210(1) and Tx0n 210(2), Tx1p 210(3) and Tx1n 210(4), Tx2p 210(5) and Tx2n 210(6), Tx3p 210(7) and Tx3n 210(8), each represent a differential pair of signals and together represent 4 DP lanes. The signals Tx4p 210(9), Tx5p 210(10), Tx6p 210(11), and Tx7p 210(12) represent the positive signals from 4 DP lanes of differential signals. The 4 switches 212(1), 212(2), 212(3), and 212(4) can select between passing differential signals and single-ended signals to the USB-C connector 132. In a differential signalizing configuration, each of the switches 212(1), 212(2), 212(3), and 212(4) connects to the upper input to enable the negative signals Tx0n 210(2), Tx1n 210(4), Tx2n 210(6), and Tx3n 210(8) to pass to the USB-C connector 132. In a single-ended signalizing configuration, each of the switches 212(1), 212(2), 212(3), and 212(4) connects to the lower input (e.g., as illustrated in FIG. 2) to enable the positive signals Tx4p 210(9), Tx5p 210(10), Tx6p 210(11), and Tx7p 210(12) to pass to the USB-C connector 132. While FIG. 1 illustrates selecting the positive signal from a differential pair when a single-ended signaling configuration is selected, in other embodiments, either the positive signal or the negative signal from each differential pair of signals may be selected for use in a single-ended signaling configuration.

208(1) is a 2-to-1 switch that selects either AUX+− OR SB_TX/SB_RX to route through the USB-C connector 132. SB_TX and SB_RX are single-ended signals, while AUX+− is a differential signal. AUX+− is both differential and bi-directional. The AUX protocol decides which end of the channel drives the AUX differential signal. 208(2) is a 2-to-2 switch, routing 4 signals to 4 pins. Switch 208(2) swaps the pairs for connector reversibility, e.g., routing USB3_TX and USB3_RX to either pins A6/A7 or pins B6/B7 depending on the connector orientation. Similarly, USB2+− are routed to either the pins A6/A7 or the pins B6/B7 depending on the connector orientation. The pins of the USB-C connector 132 that receive the signals are shown in FIG. 2 and described in more detail in FIG. 3.

A port controller in a USB-C port of the computing device 102 and a port controller in a paddleboard of the cable 104 may determine whether the port mux 108(1) and 108(2) are present in the computing device 102 and the cable 104, respectively. In response to determining that both the port mux 108(1) and 108(2) are present, the port controller may instruct the port mux 108(1) to select the single-ended signaling configuration. In response to determining that at least one of the port mux 108(1) or the 108(2) are absent, the port mux 108(1) may instruct the port mux 108(1) to select the differential signaling configuration.

In the single-ended configuration, a single signal (e.g., the positive signal) from each of the 4 differential pairs of the DP 202 and each of the 4 differential pairs of DP 204 are sent through the USB-C connector 132 to the cable 104. For example, in the single-ended configuration, the 8 lanes of DP signals Tx0p 210(1), Tx1p 210(3), Tx2p 210(5), Tx3p 210(7), Tx4p 210(9), Tx5p 210(10), Tx6p 210(11), and Tx7p 210(12) may be received by the port mux 108(2) and output as the four DP lanes 112(3) and the four DP lanes 114(3). In the differential configuration, the negative signals Tx0n 210(2), Tx1n 210(4), Tx2n 210(6), and Tx3n 210(8) and the positive signals Tx0p 210(1), Tx1p 210(3), Tx2p 210(5), Tx3p 210(7) are passed to the cable 104. In the single-ended configuration, both the USB_Rx and USB_Tx of USB3 116(2) are used to send signals through the cable 104 to the dock. The cable 104 receives the USB2+ signal 214(1), the USB2− signal 214(2), and the sideband signals 128, 130 and sends them to the dock, e.g., without involving the port mux 108(2).

USB-C Pin Use

Figure 3:
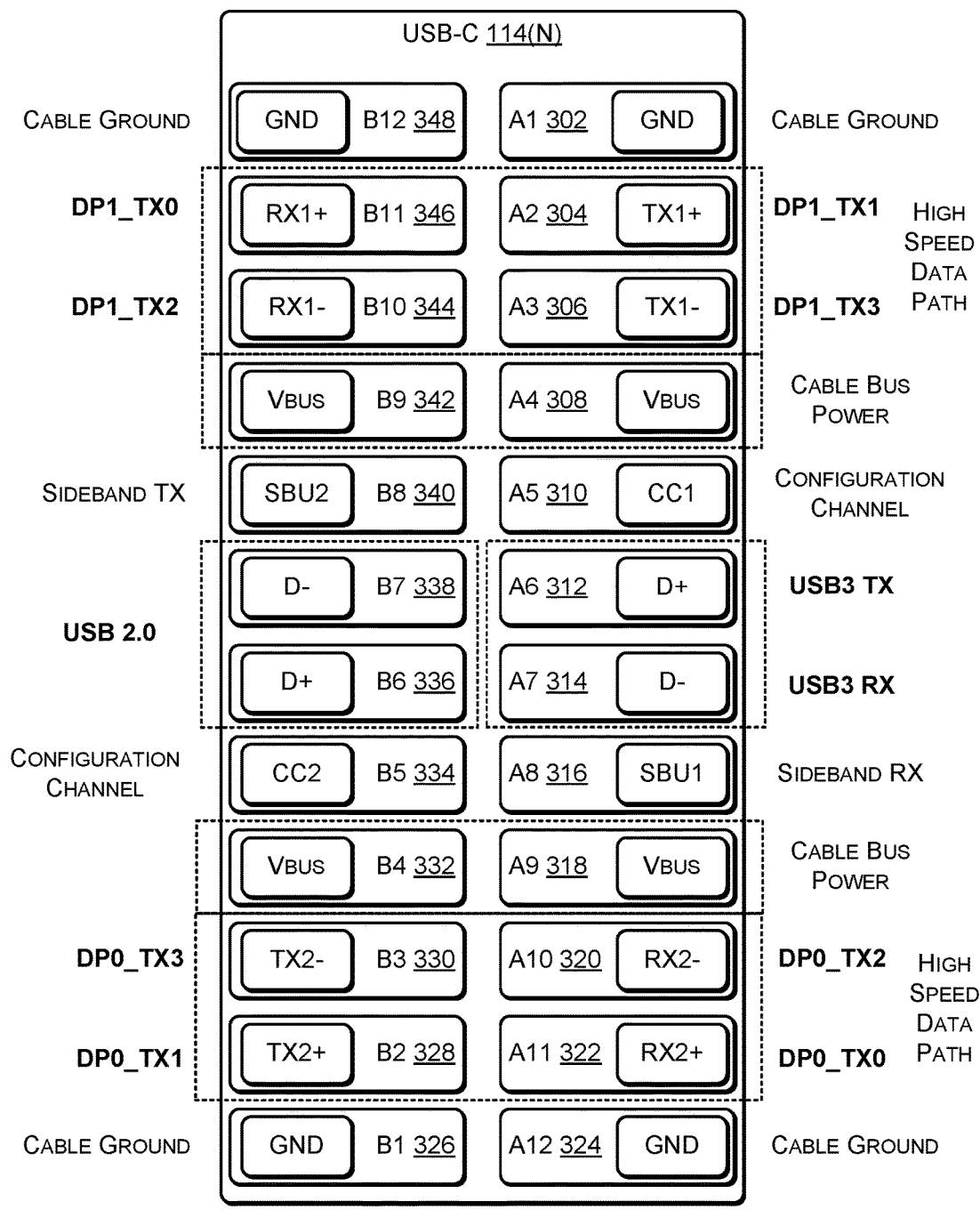
FIG. 3 is a block diagram illustrating a particular configuration of a USB-C port according to some embodiments.

FIG. 3 is a block diagram illustrating a particular configuration of a USB-C port according to some embodiments. FIG. 3 illustrates how the systems and techniques described herein use an alternate mode to increase throughput through a USB-C port.

For example, the representative USB-C connector 114(N) includes 24 pins, with an A-side having 12 pins and a B-side having 12 pins. The A-side pins include A1 302, A2 304, A3 306, A4 308, A5 310, A6 312, A7 314, A8 316, A9 318, A10 320, A11 322, and A12 324. The B-side pins include B1 326, B2 328, B3 330, B4 332, B5 334, B6 336, B7 338, B8 340, B9 342, B10 344, B11 346, and B12 348.

A USB cable that is compliant with USB Type-A ("USB-A") and USB Type-B ("USB-B"), is a directional cable, with each end of the cable having a physically different plug. The USB-A connector has a rectangular shape. The USB-B connector has a square shape, while the smaller mini-B and micro-B variants have a trapezoidal shape.

In a USB system, a tree-based structure is formed, with a single USB host at the root (typically the host device, such as a personal computer or laptop), and one or more devices (e.g., memory card etc.) as leaves off of the root. In a conventional USB system, a USB-A connector connects closer to the root, and may be referred to as a downstream facing port (DFP). A USB-B connector connects further away from the root, and may be referred to as an upstream facing port (UFP). Such a tree-based architecture prevents loops and other issues because a user cannot set up an incorrect USB tree due to the physically different connectors.

USB-C replaces both USB-A and USB-B, thereby enabling symmetrical and reversible USB-C cables while maintaining the same tree structure, e.g., one USB host and one or more USB devices. Instead of a using physically different connector and plug to identify the direction of data and power, a USB-C device indicates the device's role (e.g., the device's characteristics, the device's functionality, the type of signals that the device is configured to send and/or receive, and the like) electrically through a Configuration Channel (CC). The CC is used in the discovery, configuration and management of connections across a USB Type-C cable. For example, when an external device is connected to a USB connector of a computing device (e.g., host device), the USB connector may provide discovery data on the CC indicating that an external device has been discovered. The external device negotiates with the host device, via the CC, as to the type (e.g., voltage and amperage) of power delivery to provide, the type of data traffic (e.g., USB 1.0, USB 2.0, number of lanes of DP traffic, etc.) to provide or expect, and the like. The external device and the host device may manage the connection, via the CC, by re-negotiating the power delivery, re-negotiating the type of data traffic, etc.

Pins A1 302, A12 324, B1 326, and B12 348 provide cable ground. Pins A2 304, A3 306, B10 344 and B11 346 may provide a first high speed data path. In differential signaling mode, the A pins 304, 306 used as a differential pair for transmitting and the B pins 344, 346 used as a differential pair for receiving. In an Alternate mode, e.g., single-ended signaling mode, pins B11 346, A2 304, B10 344, and A3 306 may be used to transport four DP lanes, e.g., DP1_TX0, DP1_TX1, DP1_TX2, and DP1_TX3. Pins A10 320, A11 322, B2 328 and B3 330 may provide a second high-speed data path. In differential-signaling mode, the A pins 320, 322 may be used for receiving and the B pins 328, 330 may be used for transmitting. In the Alternate mode, e.g., single-ended signaling mode, pins A11 322, B2 328, A10 320, and B3 330 may be used may be used to transport four DP lanes, e.g., DP0_TX0, DP0_TX1, DP0_TX2, and DP0_TX3. Pins A4 308, A9 318, B4 332, and B9 342 may be used to provide cable bus power. Pins A6 312, A7 314, B6 336, and B7 338 may be used to provide USB functionality. In differential signaling mode, A6 312 and A7 314, with B6 336 and B7 338 may provide two USB 2.0 channels. In the Alternate mode, e.g., single-ended signaling mode, A6 312 and A7 314 provide USB 3.1 transmit and receive channels, while B6 336 and B7 338 may provide a USB 2.0 channel.

Each USB Type-C port has two CC pins, oriented in such a way that regardless of the orientation of the cable, the CC pin in the cable plug connects with one of the two CC pins. Each USB-C cable has a single CC wire. Thus, either pin A5 310 or pin B5 334 may be used as the CC. Typically, one of the pins A5 310 or B5 334 is used as the CC while the other pin is used as Vconn (e.g., to provide power).

A port controller may monitor whichever of the pins A5 310 and B5 334 is being used as the CC to determine the presence of absence of a port mux in the host (e.g., computing) device and in the cable and determine whether to enable differential signaling or single-ended signaling.

When a DFP (e.g., USB host) is connected to a UFP (e.g., an external USB device) using a cable, the CC on both sides are connected together, and the shared CC line has both a pull-up and a pull-down on it. Both the DFP and UFP read the voltage on the CC line and can recognize that a connection has just been made when the voltage becomes a predictable value. By monitoring the voltage on both pins A5 310 and B5 334, a host or cable can determine an orientation of the USB cable and route the other pins appropriately. There is a pullup resistor Rp on the DFP side and a pulldown resistor Rd on the UFP side. Before an external device is connected to a USB-C port, the DFP VBUS has no output. After an external device is connected to the USB-C port, e.g., connecting the host device (DFP) with the external device (UFP), the CC pin in the DFP detects the voltage drop at the CC pin caused by Rd, thereby notifying the DFP (via the CC) that the UFP has been connected.

The CC may be used to communicate Vendor Defined Messages (VDMs). An identifier (ID) may be included in a sixteen-bit ID field in each VDM. There are two types of IDs: Standardized ID (SID) and Vendor specific ID (VID). SID and VIDs are assigned by a standards body (e.g., the USB Implementers Forum (USB-IF)). The USB-IF assigns SIDs to standards groups and assigns VIDs to companies. The SID refers to a specific type of alternate mode of operation, such as the Display Port Alternate Mode ("Alt Mode" promulgated by the Video Electronics Standards Association (VESA)) and the Mobile High-Definition Link (MHL) Alt Mode (promulgated by the MHL consortium). Companies can use their unique VID to establish a proprietary mode that works between their own UFP and DFP. For example, a dock made by Dell® connected using a Dell® cable to a Dell® computing device (e.g., desktop computer, laptop computer, or tablet computer) may establish a proprietary mode, such as single-ended signaling mode. The proprietary mode may be used to provide features that are not available with external devices made by other companies. In order to enter or exit an Alternate (Alt) mode, structured VDMs may be used. The structured VDMs may have well-defined but extensible commands and are modal in behavior. For example, two commands are "Enter Mode" and "Exit Mode." Once an Alt Mode is enabled, specialized commands and data, known as unstructured VDMs, may be used to provide vendor-customized formats.

Thus, when a computing device is connected via a cable to a dock, a port controller in the computing device and a port controller in the cable may determine that both the computing device and the cable include the port mux 108 of FIGS. 1 and 2. In response, the computing device may enter a single-ended signaling configuration to enable the dock to provide two DP channels of four lanes each. The computing device may exit single-ended signaling mode and enter differential signaling mode (e.g., the default mode) when (1) the cable is disconnected from the computing device, (2) the cable is connected to another computing device that does not include the port mux, or (3) the connecting device is connected to the dock using another cable that does not include the port mux.

Port Multiplexer with Crosspoint Switch

Figure 4A:
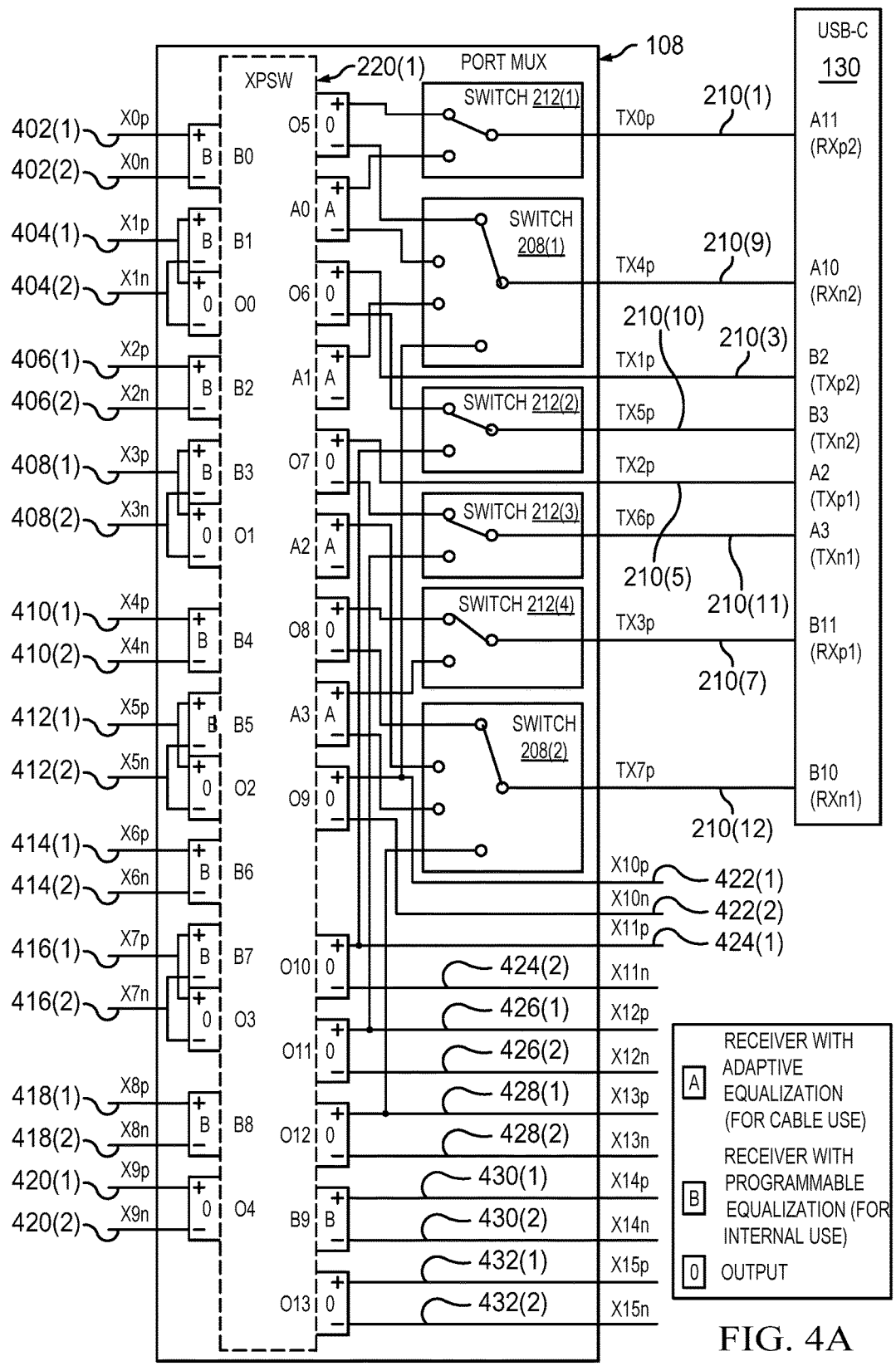
FIG. 4A is a block diagram illustrating a port mux that includes a crosspoint switch according to some embodiments.

FIG. 4A is a block diagram illustrating a port mux that includes a crosspoint switch according to some embodiments. The XPSW 220(1) may be included in the port mux chip 108. In the figures, "p" indicates a positive signal, "n" indicates a negative signal. Wires having a same label and ending with p and n represent a differential pair of signals. For example, X0p and X0n represent a differential pair of signals, with X0p carrying a positive signal and X0n carrying a negative signal.

The crosspoint switch (XPSW) 220(1) may receive multiple differential pairs of signals, such as 402(1) and 402(2), 404(1) and 404(2), 406(1) and 406(2), 408(1) and 408(2), 410(1) and 410(2), 412(1) and 412(2), 414(1) and 414(2), 416(1) and 416(2), 418(1) and 418(2), and 4210(1) and 420(2). The crosspoint switch 220(1), along with the switches 208(1), 208(2), 212(1), 212(2), 212(3), and 212(4) may be configured to select each differential pair of signals in the differential signaling configuration and may be configured to select one signal (e.g., the positive signal) from each of the differential pair of signals in the single-ended configuration. Typical configurations of the port muxes 108 are illustrated in more detail in subsequent figures.

In the single-ended signaling configuration, the port mux 108 may output two DP channels of four lanes each, e.g., 210(1), 210(3), 210(5), 210(7) and 210(9), 210(10), 210(11), 210(12) selected from the differential signal pairs 422(1) and 422(2), 424(1) and 424(2), 426(1) and 426(2), 428(1) and 428(2), 430(1) and 430(2), and 432(1) and 432(2).

As shown in FIG. 4A, the signals received by the left side of the crosspoint switch 220(1) marked "B" may use programmable equalization, e.g., the equalization may be programmed at the factory to a pre-determined amount, after which the equalization may not change. The signals sent from the right side of the crosspoint switch 220(1) marked "A" may use adaptive equalization, e.g., the equalization may change in response to changing conditions of the signals sent over the cable.

FIG. 4B is a block diagram illustrating connections to a crosspoint switch according to some embodiments. Because the crosspoint switches (XPSW) 220 of FIG. 2 are used for a very specific purpose, all the possible connections the crosspoint switches 220 use internally are shown in FIG. 4B. Connections used for a normal orientation of the USB-C connector are marked "Y" and connections used for a flipped (e.g., reverse) orientation of the USB-C connector are marked "F" in FIG. 4B. Of the 14×14=196 possible connections in the crosspoint switches 220, only the 34 connections that are marked as "Y", "F", or "YF" are used. The remaining connections (shown as blank in FIG. 4B) are unused. Because the number of connections used are sparse, the cost to manufacture each of the crosspoint switches 220 is relatively low, reducing the cost to provide a USB-C dock, as compared to using ThunderBolt™.

Configuration of Port Mux in a Computing Device to Support the Dock's Ports

Figures 1, 5A:
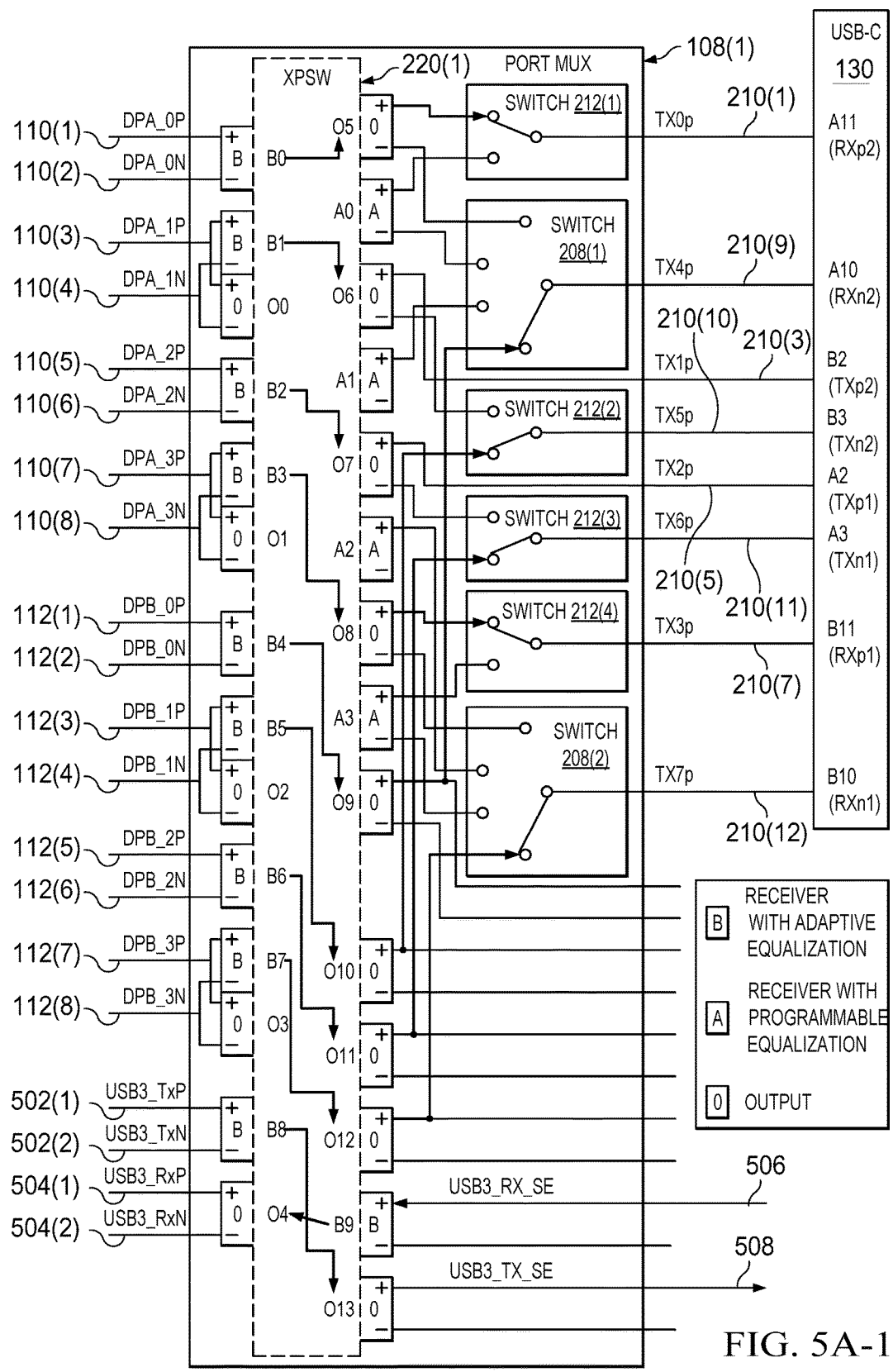

FIG. 5A-1 is a block diagram illustrating a configuration of a cable's port mux and crosspoint switch to provide increased throughput according to some embodiments. FIG. 5A-1 illustrates the connections in the port mux 108(1) (including the XPSW 220(1)) in the computing device 102 to support the dock 106 configured to provide two DP channels A and B (DPA and DPB in the figures), with four lanes in each DP channel, multiple USB ports, and other ports, as shown in FIG. 1. For illustration purposes, in FIG. 5A-1, the positive signal from each differential pair of signals is selected in the single-ended signaling configuration. It should understood that one of the signals, e.g., positive or negative, is selected from a differential pair in the single-ended signaling configuration.

In FIG. 5A-1, signal DPA_0p 110(1) is routed from B0+ to O5+ in the XPSW 220(1) and output via the switch 212(1) as signal Tx0p 210(1). Signal DPB_0p 112(1) is routed from B4+ to O9+ in the XPSW 220(1) and output via the switch 208(1) as signal Tx4p 210(9). Signal DPB_1p 112(3) is routed from B5+ to O10+ in the XPSW 220(1) and output via the switch 212(2) as signal Tx5p 210(10). Signal DPB_2p 112(5) is routed from B6+ to O11+ in the XPSW 220(1) and output via the switch 212(3) as signal Tx6p 210(11). Signal DPA_3p 110(7) is routed from B3+ to O8+ in the XPSW 220(1) and output via the switch 212(4) as Tx3p signal 210(7). Signal DPB_3p 112(7) is routed from B7+ to O12+ in the XPSW 220(1) and output via the switch 208(2) as Tx7p signal 210(12). Signal DPA_1p 110(3) is routed from B1+ to O6+ in the XPSW 220(1) and output as Tx_1p signal 210(3). Signal DPB_2p 112(5) is routed from B2+ to O7+ in the XPSW 220(1) and output as Tx2p signal 210(5).

USB3_Txp 502(1) is routed from B8+ to O13+ in the XPSW 220(1) and output as USB3_Tx_SE 508. USB3_Txn 502(2) is the negative signal from the differential pair and may be ignored. USB3_RX_SE 506 is received at B9+ and sent to O4 to be received in the computing device 102 as USB3_Rxp 504(1) and USB3_Rxn 504(2). USB3_Txp 502(1) and USB3_Txn 502(2) are the differential transmit signals and USB3_Rxp 504(1) and USB3_Rxn 504(2) are the differential receive signals associated with USB3 116(1) of FIG. 1.

FIG. 5A-2 is a diagram illustrating connections in the crosspoint switch of FIG. 5A-1 according to some embodiments. FIG. 5A-2 illustrates the normal and flipped connections used internally by the crosspoint switch (XPSW) 220(1) for the configuration shown in FIG. 5A-1. Connections used for a normal orientation of the USB-C connector are marked "Y" and connections used for a flipped (e.g., reverse) orientation of the USB-C connector are marked "F". The remaining connections shown as blank or have no arrows illustrated are unused in this example.

The arrows indicate associations between Y's and F's. For example, the Y at location B7, O12 is active (e.g., on) when a connector of the cable 104 is inserted in a normal orientation. When the connector is inserted in a flipped orientation, the Y at location B7, O12 is off and the associated F at location B7, O9 is on.

Configuration of Port Mux in a Cable to Support the Dock's Ports

Figures 1, 5B:
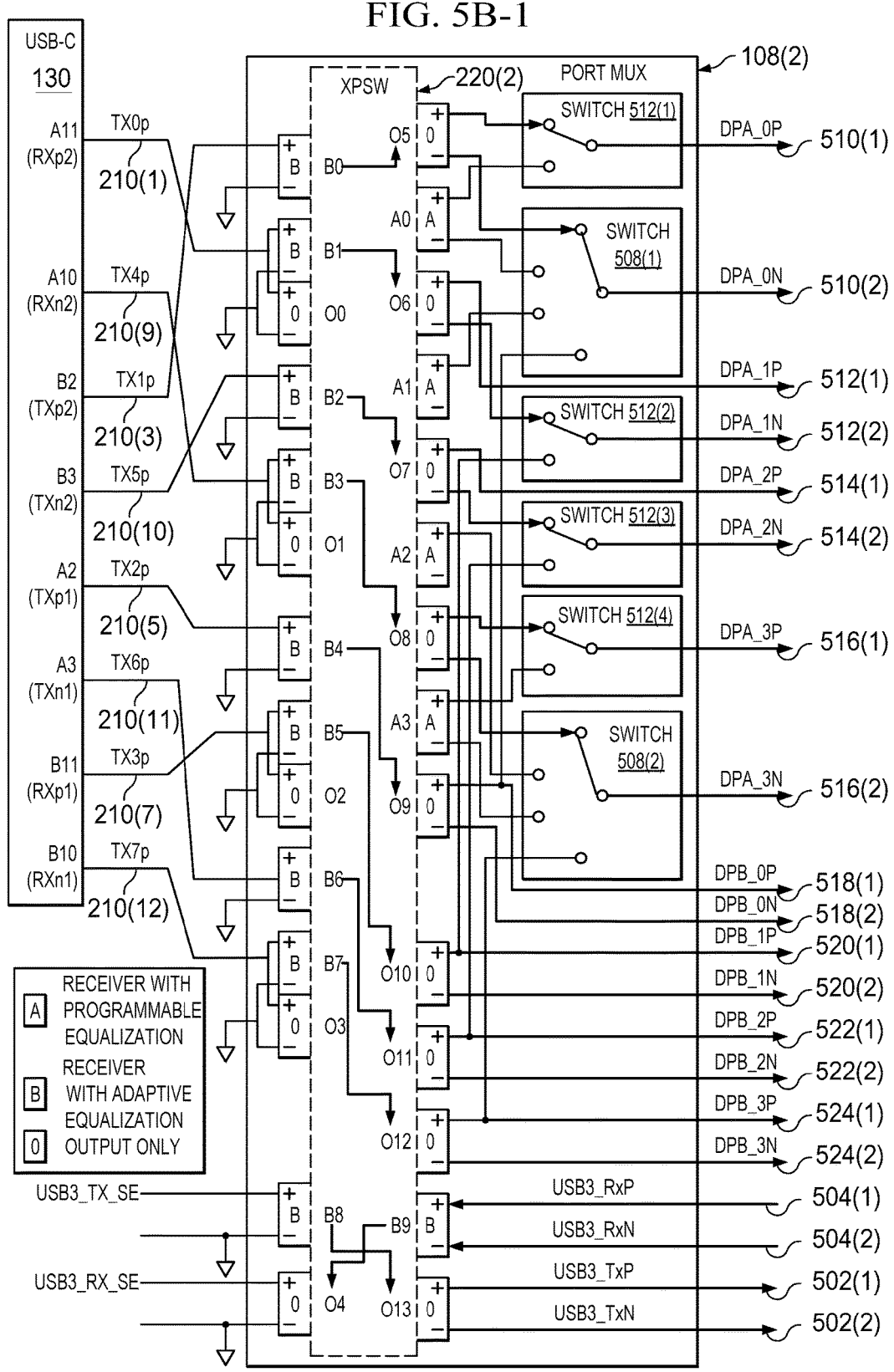

FIG. 5B-1 is a block diagram illustrating a configuration of a cable's port mux and crosspoint switch to provide increased throughput according to some embodiments. FIG. 5B-1 illustrates the connections in the port mux 108(2) (including the XPSW 220(2)) in the cable 104 to support the dock 106 configured to provide two DP channels, with four lanes in each DP channel, multiple USB ports, and other ports, as shown in FIG. 1. The port mux 108(2) in the cable 104 includes switches 508(1), 508(2), 512(1), 512(2), 512(3), and 512(4), corresponding to the switches 208(1), 208(2), 212(1), 212(2), 212(3), and 212(4) of the port mux 108(1) in the computing device 102. USB3_Txp 502(1) and USB3_Txn 502(2) are the differential transmit signals and USB3_Rxp 504(1) and USB3_Rxn 504(2) are the differential receive signals associated with USB3 116(3) of FIG. 1.

The output of the port mux 108(2) are (a) differential pairs for DP channel A: DPA_0p 110(1) and DPA_0n 110(2), DPA_1P 110(3) and DPA_1N 110(4), DPA_2p 110(5) and DPA_2n 110(6), DPA_3P 110(7) and DPA_3N 110(8), (b) differential pairs for DP channel B: DPB_0p 112(1) and DPB_0n 112(2), DPB_1P 112(3) and DPB_1N 112(4), DPB_2p 112(5) and DPB_2n 112(6), DPB_3P 112(7) and DPB_3N 112(8), and (c) USB3 receive pair USB3_Rxp 504(1) and USB_Rxn 504(2), and USB3 transmit pair USB3_Txp 502(1) and USB3_Txp 502(2).

Tx0p 210(1) is routed by the XPSW 220(2) from B1 to O6 and output as DPA_1p 512(1) and via switch 512(2) as DPA_1n 512(2). Tx4p 210(9) is routed by the XPSW 220(2) from B3 to O8 and output via switch 512(4) as DPA_3p 516(1) and output via switch 508(2) as DPA_3n 516(2). Tx1p 210(3) is routed by the XPSW 220(2) from B0 to O5 and output via switch 512(1) as DPA_0p 510(1) and output via switch 508(1) as DPA_0n 510(2). Tx5p 210(3) is routed by the XPSW 220(2) from B2 to O7 and output as DPA_2p 514(1) and DPA_0n 514(2).

Tx2p 210(5) is routed by the XPSW 220(2) from B4 to O9 and output as DPB_0p 518(1) and DPB_0n 518(2). Tx6p 210(11) is routed by the XPSW 220(2) from B6 to O11 and output as DPB_2p 522(1) and DPB_2n 522(2). Tx3p 210(7) is routed by the XPSW 220(2) from B5 to O10 and output as DPB_1p 520(1) and DPB_1n 520(2). Tx7p 210(12) is routed by the XPSW 220(2) from B7 to O12 and output as DPB_3p 524(1) and DPB_3n 524(2).

USB3_TX_SE is routed by the XPSW 220(2) from B8 to O13 and output as USB3_Txp 502(1) and USB3_Txn 502(2). USB3_Rxn 504(1) and USB3_Rxn 504(2) are received by the XPSW 220(2) and routed from B9 to O4 and accessed as USB3_RX_SE.

FIG. 5B-2 is a diagram illustrating connections in the crosspoint switch of FIG. 5B-1 according to some embodiments. FIG. 5B-2 illustrates the normal connections used internally by the crosspoint switch (XPSW) 220(2) for the configuration shown in FIG. 5B-1. Connections used for a normal orientation of the USB-C connector are marked "Y". However, the flipped orientation is not used because the flipped orientation is handled by the port mux 108(1); therefore no flipped connections are shown in FIG. 5B-2. The remaining connections (shown as blank) are unused.

EXAMPLE

Universal Serial Bus (USB)

Figure 6A:
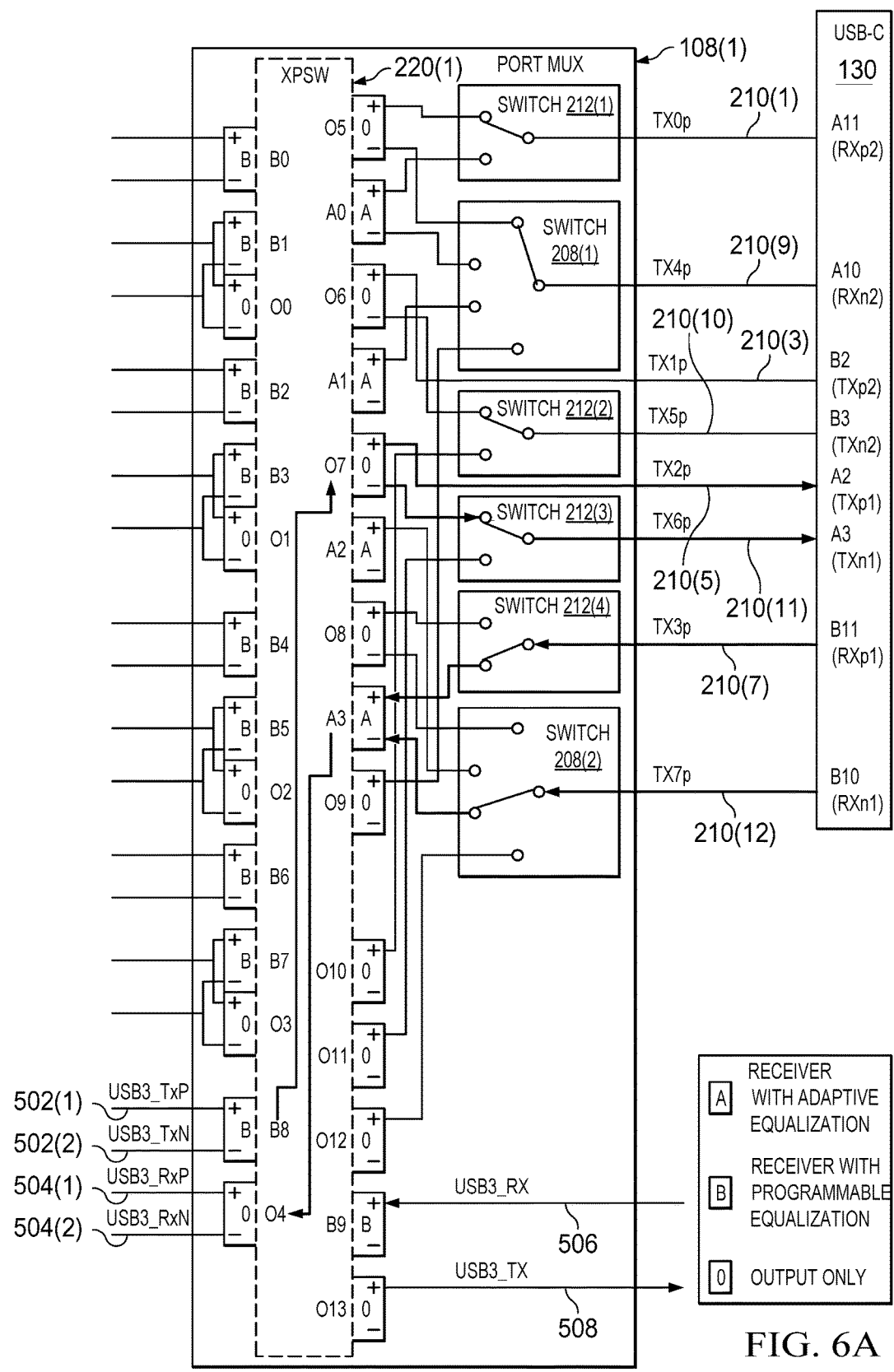
FIG. 6A is a block diagram illustrating a configuration of a computing device's port mux and crosspoint switch to support a dock providing a USB-C compliant port according to some embodiments.

FIG. 6A is a block diagram illustrating a configuration of a computing device's port mux and crosspoint switch to support a doc providing a USB-C compliant port according to some embodiments. FIG. 6A illustrates the connections in the port mux 108(1) (including the XPSW 220(1)) in the computing device 102 to communicate USB3 compliant signals via the dock 106 shown in FIG. 1.

Signal USB3_Tx*p* 502(1) is routed from B8+ to O7+ in the XPSW 220(1) and output as signal Tx2*p* 210(5). Signal USB3_Tx*p* 502(2) is routed from B8− to O7− in the XPSW 220(1) and output via the switch 212(3) as signal Tx6*p* 210(11).

Signal Tx3*p* 210(7) from the USB-C connector 130 is routed to A3+ using switch 212(4) and from A3+ to USB3_Rx*p* 504(1). Signal Tx7*p* 210(12) from the USB-C connector 130 is routed to A3− using switch 208(2) and from A3 1 to USB3_Rx*n* 504(2).

FIG. 6B is a diagram illustrating connections in the crosspoint switch of FIG. 6A according to some embodiments. FIG. 6B illustrates the normal and flipped connections used internally by the crosspoint switch (XPSW) 220(1) for the configuration shown in FIG. 6A. Connections used for a normal orientation of the USB-C connector are marked "Y" and connections used for a flipped (e.g., reverse) orientation of the USB-C connector are marked "F". The remaining connections (shown as blank) are unused.

The arrows indicate associations between Y's and F's. For example, the Y location at A3, O4 is active (e.g., on) when the connector of the cable 104 is inserted in a normal orientation. When the connector is inserted in a flipped orientation, the Y at location A3, O4 is off and the associated F at location A0, O4 is on.

Configuration to Support Display Port (DP)

Figure 7A:
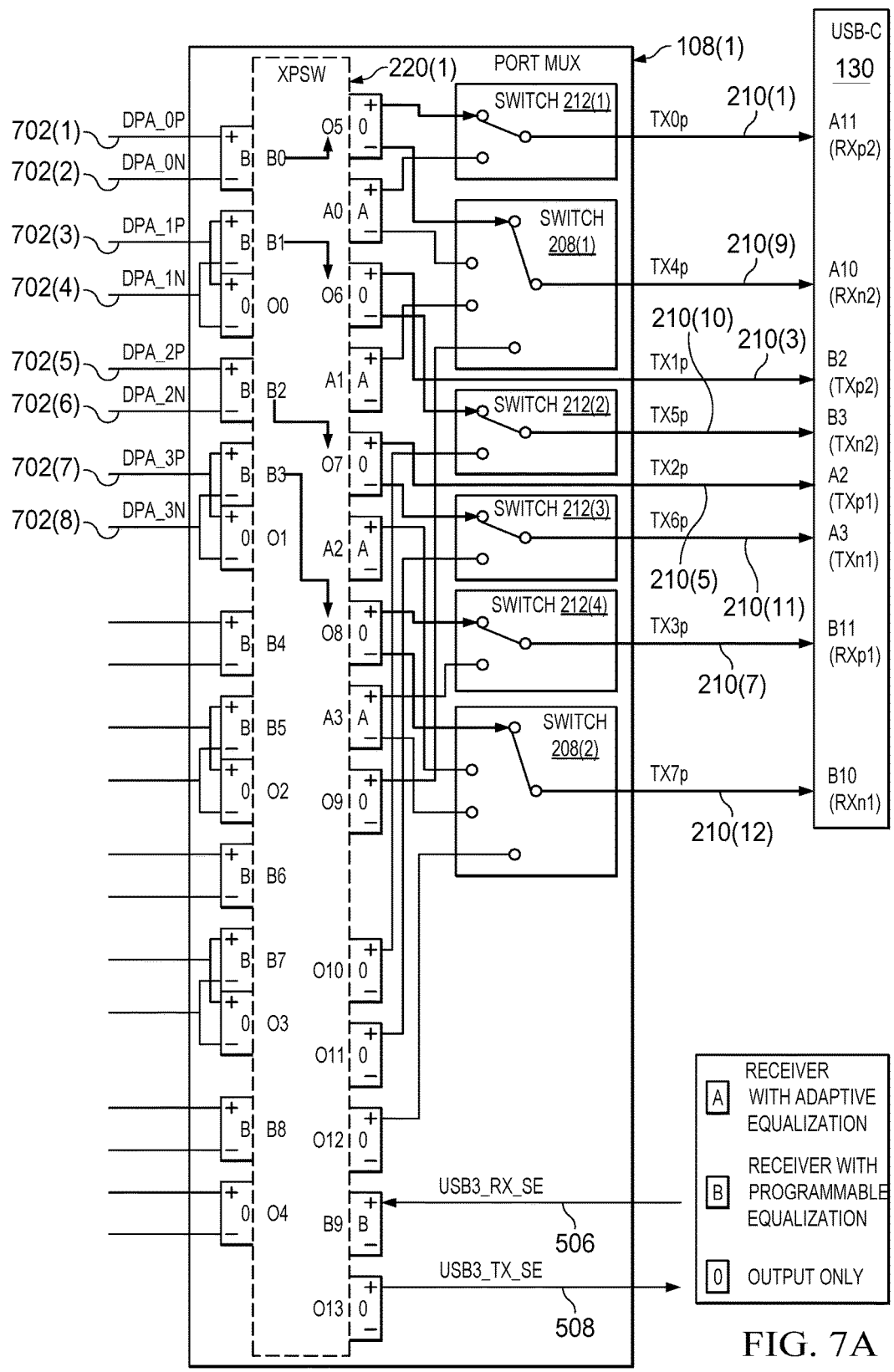
FIG. 7A is a block diagram illustrating a configuration of a computing device's port mux and crosspoint switch to support a display port (DP) monitor according to some embodiments.

FIG. 7A is a block diagram illustrating a configuration of a computing device's port mux and crosspoint switch to support a DP monitor according to some embodiments. FIG. 7A illustrates the connections in the port mux 108(1) (including the XPSW 220(1)) in the computing device 102 to drive a single DP monitor via the dock 106 shown in FIG. 1. In this example, each of the signals of the four differential pairs are used to provide two DP channels of four lanes each.

Signal DPA_0*p* 702(1) is routed from B0+ to O5+ in the XPSW 220(1) and output via the switch 212(1) as signal Tx0*p* 210(1). Signal DPA_0*n* 702(2) is routed from B0− to O5− in the XPSW 220(1) and output via the switch 208(1) as signal Tx4*p* 210(9). Signal DPA_1*p* 702(3) is routed from B1+ to O6+ in the XPSW 220(1) and output as signal Tx1*p* 210(3). Signal DPA_1*n* 702(4) is routed from B0− to O6− in the XPSW 220(1) and output via the switch 212(2) as signal Tx5*p* 210(10). Signal DPA_2*p* 702(5) is routed from B2+ to O7+ in the XPSW 220(1) and output as signal Tx2*p* 210(5). Signal DPA_2*n* 702(6) is routed from B2− to O7− in the XPSW 220(1) and output via the switch 212(3) as signal Tx6*p* 210(11). Signal DPA_3*p* 702(7) is routed from B3+ to O8+ in the XPSW 220(1) and output via the switch 212(4) as signal Tx3*p* 210(7). Signal DPA_3*n* 702(8) is routed from B3− to O8− in the XPSW 220(1) and output via the switch 208(2) as signal Tx7*p* 210(12).

FIG. 7B is a diagram illustrating connections in the crosspoint switch of FIG. 7A according to some embodiments. FIG. 7B illustrates the normal and flipped connections used internally by the crosspoint switch (XPSW) 220(1) for the configuration shown in FIG. 7A. Connections used for a normal orientation of the USB-C connector are marked "Y" and connections used for a flipped (e.g., reverse) orientation of the USB-C connector are marked "F". The remaining connections (shown as blank) are unused.

The arrows indicate associations between Y's and F's. For example, the Y at location B3, O8 is active (e.g., on) when a connector of the cable 104 is attached in a normal orientation. When the connector is attached in a flipped orientation, the Y at location B3, O8 is off and the associated F at location B3, O5 is on.

Configuration of Port Mux in a Computing Device for Multi-Function Display Port

Figures 1, 8A:
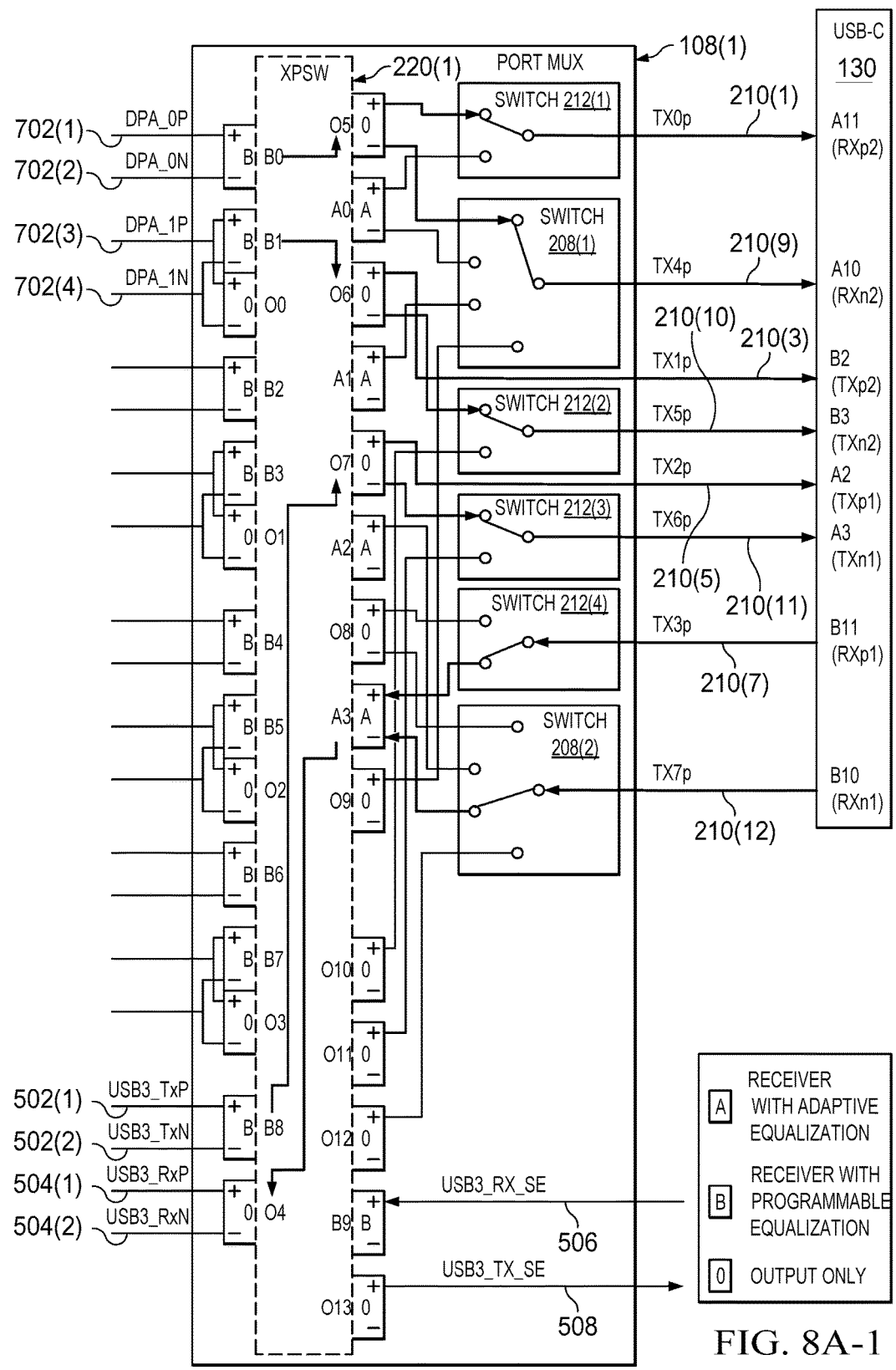

FIG. 8A-1 is a block diagram illustrating a configuration of a computing device's port mux and crosspoint switch to support multi-function display port (MFDP) according to some embodiments. FIG. 8A-1 illustrates the connections in the port mux 108(1) (including the XPSW 220(1)) in the computing device 102 to drive an MFDP via the dock 106 shown in FIG. 1.

Signal DPA_0*p* 702(1) is routed from B0+ to O5+ in the XPSW 220(1) and output via the switch 212(1) as signal Tx0*p* 210(1). Signal DPA_0*n* 702(2) is routed from B0− to O5− in the XPSW 220(1) and output via the switch 208(1) as signal Tx4*p* 210(9). Signal DPA_1*p* 702(3) is routed from B1+ to O6+ in the XPSW 220(1) and output as signal Tx1*p* 210(3). Signal DPA_1*n* 702(4) is routed from B0− to O6− in the XPSW 220(1) and output via the switch 212(2) as signal Tx5*p* 210(10). Thus, the four DP lanes are transmitted as single-ended signals Tx02*p* 210(1), Tx4*p* 210(9), Tx1*p* 210(3), and Tx5*p* 210(10) through the USB-C connector 130 to the cable 104.

Signal USB3_Tx*p* 502(1) is routed from B8+ to O7+ in the XPSW 220(1) and output as signal Tx2*p* 502(1). Signal USB3_Tx*p* 502(2) is routed from B8− to O7− in the XPSW 220(1) and output via the switch 212(3) as signal Tx6*p* 210(11). Signal Tx3*p* 210(7) from the USB-C connector 130 is routed using switch 212(4) to A3+ and routed from A3+ to USB3_Rx*p* 504(1). Signal Tx7*p* 210(12) from the USB-C connector 130 is routed to A3− using switch 208(2) and routed from A3− to USB3_Rx*n* 504(2). Thus, the single-ended signal USB_Tx_SE 508 is sent based on the differential pair of USB3 transmit signals 502(1), 502(20) and the single-ended signal USB_Rx_SE is received and converted into the differential pair of receive signals 504(1), 504(2).

FIG. 8A-2 is a diagram illustrating connections in the crosspoint switch of FIG. 8A-1 according to some embodiments. FIG. 8A-2 illustrates the normal and flipped connections used internally by the crosspoint switch (XPSW) 220(1) for the configuration shown in FIG. 8A-1. Connections used for a normal orientation of the USB-C connector are marked "Y" and connections used for a flipped (e.g., reverse) orientation of the USB-C connector are marked "F". The remaining connections (shown as blank) are unused.

The arrows indicate associations between Y's and F's. For example, the Y at location B8, O7 is active (e.g., on) when the connector is inserted into a port with a normal orientation. When the connector is inserted into the port with a flipped orientation, the Y at location B8, O7 is off and the associated F at location B8, O6 is on.

Configuration of Port Mux in a Cable for Multi-Function Display Port

Figures 1, 8B:
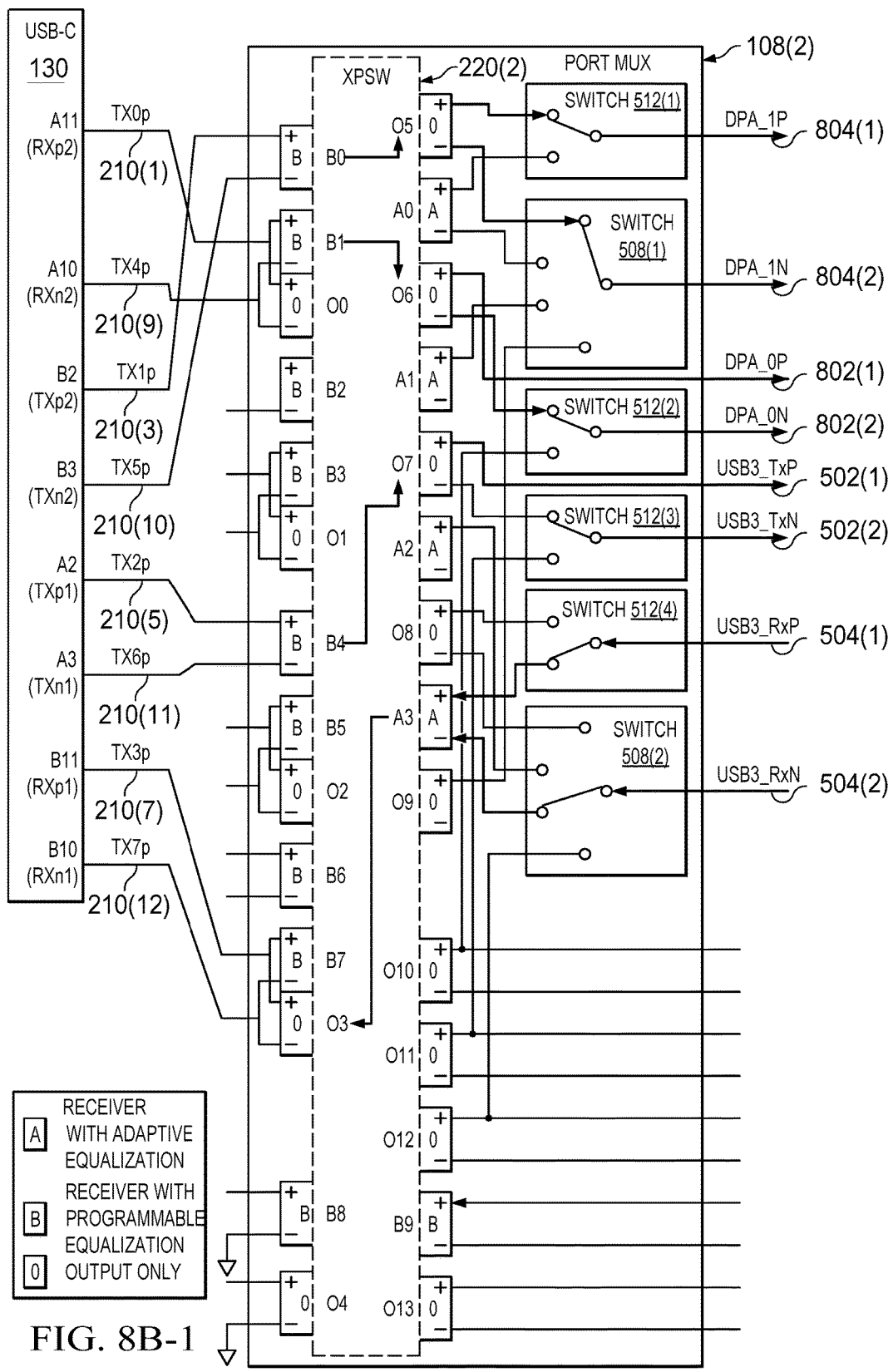

FIG. 8B-1 is a block diagram illustrating a configuration of a cable's port mux and crosspoint switch to support MFDP according to some embodiments. FIG. 8B-1 illustrates the connections in the port mux 108(2) (including the XPSW 220(2)) in the cable 104 to drive an MFDP via the dock 106 shown in FIG. 1.

Tx1*p* 210(3) and Tx5*p* 210(1) are routed by the XPSW 220(2) from B0 to O5 and output via switch 512(1) as DPA_1*p* 804(1) and output via switch 508(1) as DPA_1*n* 804(2), respectively. Tx0*p* 210(1) and Tx4*p* 210(9) are routed by the XPSW 220(2) from B1 to O6 and output as DPA_0*p* 802(1) and output via switch 512(2) as DPA_0*n* 802(2), respectively.

Tx2*p* 210(5) and Tx6*p* 210(11) are routed by the XPSW 220(2) from B4 to O7 and output via switch 512(2) as USB3_Tx*p* 502(1) and output via switch 512(3) as USB3_Txn 502(2), respectively. Switch 512(4) routes USB3_Rxp 504(1) and switch 508(2) routes USB3_Rxn 504(2) to A3 where the XPSW 220(2) routes the signal to O3 as Tx3*p* 210(7) and Tx7*p* 210(12), respectively.

FIG. 8B-2 is a diagram illustrating connections in the crosspoint switch of FIG. 8B-1 according to some embodiments. FIG. 8B-2 illustrates the normal and flipped connections used internally by the crosspoint switch (XPSW) 220(2) for the configuration shown in FIG. 8B-1. Connections used for a normal orientation of the USB-C connector are marked "Y" and connections used for a flipped (e.g., reverse) orientation of the USB-C connector are marked "F". The remaining connections (shown as blank) are unused. However, because the connections shown are internal to the dock 106, the flipped orientation is not used; therefore no flipped connections are shown in FIG. 8B-2.

Configuration of Port Mux in a Computing Device for PCIe

Figures 1, 9A:
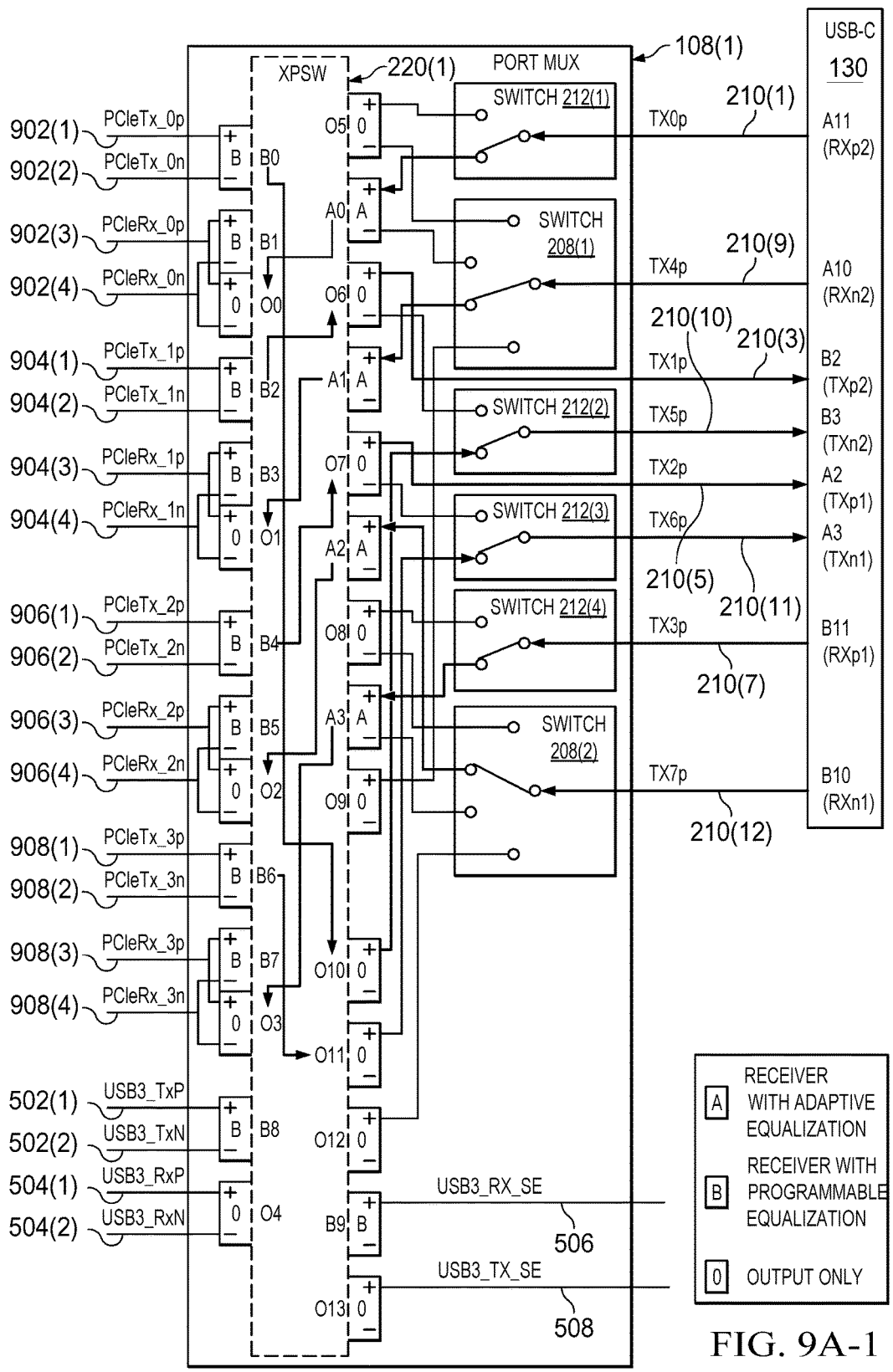

FIG. 9A-1 is a block diagram illustrating a configuration of a computing device's port mux and crosspoint switch to provide four transmit (Tx) and four receive (Rx) channels of Peripheral Component Interconnect Express (PCIe) according to some embodiments. FIG. 9A-1 illustrates the connections in the port mux 108(1) (including the XPSW 220(1)) in the computing device 102 to provide four Tx channels and four Rx channels of PCIe via the dock 106 shown in FIG. 1. USB3 signals 502(1), 502(2), 504(1), 504(2), 506, and 508 may be transmitted and received as described above.

The XPSW 220(1) may be connected to PCIe transmit (Tx) differential pairs of signals 902(1) and 902(2), 904(1) and 904(2), 906(1) and 906(2), 908(1) and 908(2). The XPSW 220(1) may be connected to PCIe receive (Rx) differential pairs of signals 902(3) and 902(4), 904(3) and 904(4), 906(3) and 906(4), 908(3) and 908(4). The XPSW 220(1) may select a single Tx signal (e.g., positive) from each differential pair of Tx signals to the dock 106 and a single Rx signal (e.g., positive) from each differential pair of Rx signals from the dock 106 of FIG. 1.

For the Tx signals, PCIeTx_0p 902(1) is routed from B0+ to O10+ in the XPSW 220(1) and output via the switch 212(2) as signal Tx5*p* 210(10). PCIeTx_1p 904(1) is routed from B2+ to O6+ in the XPSW 220(1) and output as signal Tx_1p 210(3). PCIeTx_2p 906(1) is routed from B4+ to O7+ in the XPSW 220(1) and output as signal Tx2*p* 210(5). PCIeTx_3p 908(1) is routed from B6+ to O11+ in the XPSW 220(1) and output via the switch 212(3) as signal Tx6*p* 210(11).

For the Rx signals, Tx0*p* 210(1) is received from the USB-C connector 130 by the switch 212(1) and routed to A0+ of the XPSW 220(1) where the signal is routed from A0+ to O0+ and output as PCIeRx_0p 902(3). Tx4*p* 210(9) is received from the USB-C connector 130 by the switch 208(1) and routed to A1+ of the XPSW 220(1) where the signal is routed from A1+ to O1+ and output as PCIeRx_1p 904(3). Tx3*p* 210(7) is received from the USB-C connector 130 by the switch 212(4) and routed to A3+ of the XPSW 220(1) where the signal is routed from A3+ to O3+ and output as PCIeRx_3p 908(3). Tx7*p* 210(12) is received from the USB-C connector 130 by the switch 208(2) and routed to A2+ of the XPSW 220(1) which routes the signal from A2+ to O2+ where it is output as PCIeRx_2p 906(3).

FIG. 9A-2 is a diagram illustrating connections in the crosspoint switch of FIG. 9A-1 according to some embodiments. FIG. 9A-2 illustrates the normal and flipped connections used internally by the XPSW 220(1) for the configuration shown in FIG. 9A-1. Connections used for a normal orientation of the USB-C connector are marked "Y" and connections used for a flipped (e.g., reverse) orientation of the USB-C connector are marked "F". The remaining connections (shown as blank) are unused.

The arrows indicate associations between Y's and F's. For example, the Y at location B6, O11 is active (e.g., on) when the connector is inserted into a port with a normal orientation. When the connector is inserted into the port with a flipped orientation, the Y at location B6, O11 is off and the associated F at location B6, O10 is on.

Configuration of Port Mux in a Cable for PCIe

FIG. 9B-1 is a block diagram illustrating a configuration of a cable's port mux and crosspoint switch to provide four transmit (Tx) and four receive (Rx) PCIe channels according to some embodiments. FIG. 9B-1 illustrates the connections in the port mux 108(2) (including the XPSW 220(2)) in the dock 106 to provide four Tx channels and four Rx lanes of PCIe via the dock 106 of FIG. 1.

For the Rx signals, the switch 512(1) routes signal PCIeRx_0p 902(3) to A0+ of the XPSW 220(2) where the signal is routed to O0+ and sent to the computing device 102 as TX0p 210(1). The switch 508(1) routes signal PCIeRx_1p 904(3) to A1+ of the XPSW 220(2) where the signal is routed to O1+ and sent to the computing device 102 as TX4p 210(9). The switch 512(4) routes signal PCIeRx_3p 908(1) to A3+ of the XPSW 220(2) where the signal is routed to O3+ and sent to the computing device 102 as TX7p 210(12). The switch 508(2) routes signal PCIeRx_2p 906(3) to A2+ of the XPSW 220(2) where the signal is routed to O2+ and sent to the computing device 102 as TX3p 210(7).

For the Tx signals, Tx5*p* 210(10) is routed by the XPSW 220(2) from B2 to O6 and output as PCIeTx_0p 902(1) and (via switch 512(2)) as PCIeTx_0n 902(2). Tx2*p* 210(5) is routed by the XPSW 220(2) from B4 to O7 and output as PCIeTx_2p 906(1) and (via switch 512(3)) as PCIeTx_2n 906(2). Tx_1p 210(3) is routed by the XPSW 220(2) from B0 to O10 and output as PCIeTx_1*p* 904(1) and as PCIeTx_1n 904(2). Tx6*p* 210(11) is routed by the XPSW 220(2) from B6 to O11 and output as PCIeTx_3p 908(1) and as PCIeTx_3n 908(2).

FIG. 9B-2 is a diagram illustrating connections in the crosspoint switch of FIG. 9B-1 according to some embodiments. FIG. 9B-2 illustrates the normal and flipped connections used internally by the XPSW 220(2) for the configuration shown in FIG. 9B-1. Connections used for a normal orientation of the USB-C connector are marked "Y" and connections used for a flipped (e.g., reverse) orientation of the USB-C connector are marked "F". The remaining connections (shown as blank) are unused. However, because the connections shown are internal to the dock 106, the flipped orientation is not used; therefore no flipped connections are shown in FIG. 9B-2.

Port Controllers

Figure 10:
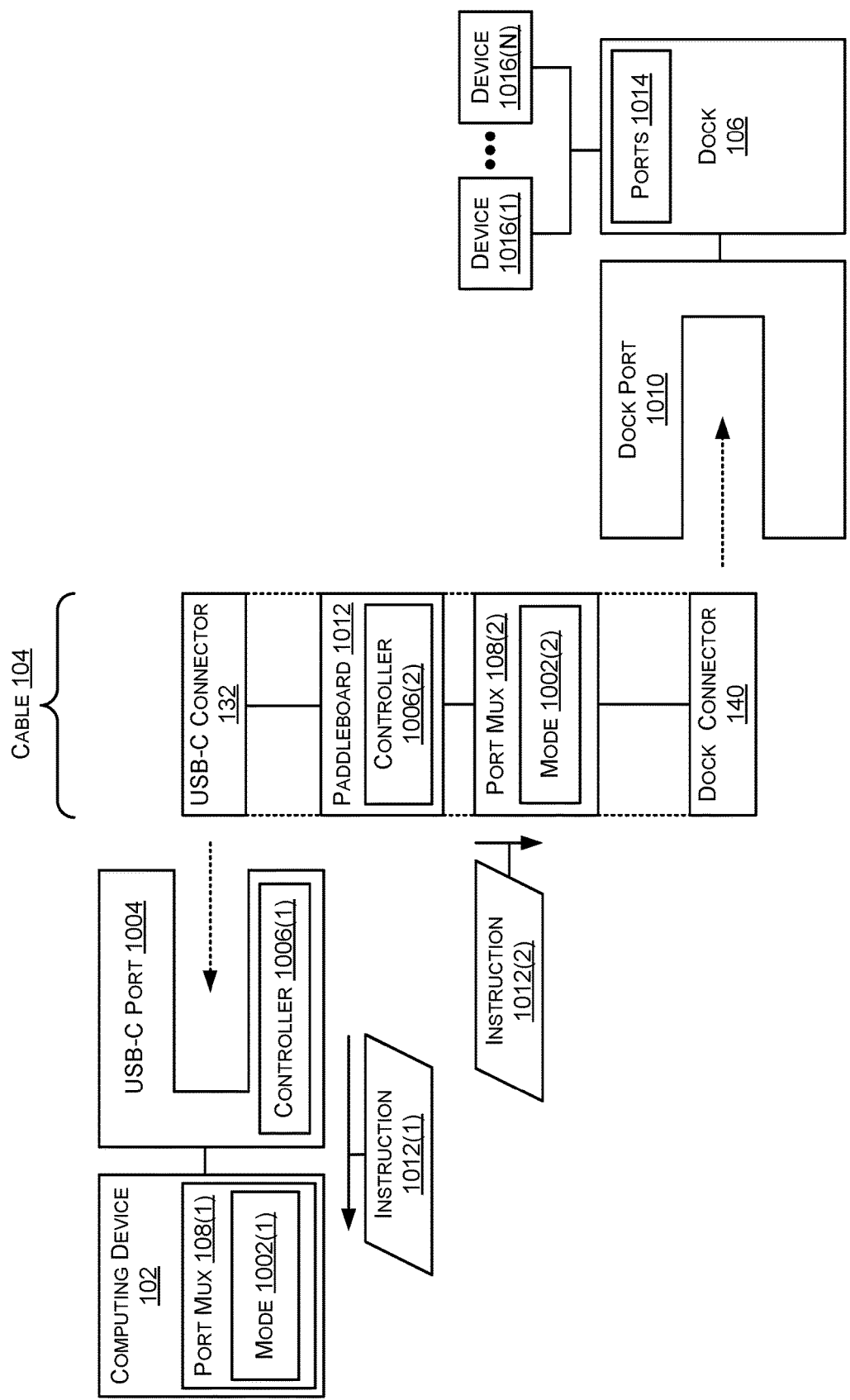
FIG. 10 illustrates an example configuration of a computing device connected to a dock using a cable according to some embodiments.

FIG. 10 illustrates an example configuration of a computing device connected to a dock using a cable according to some embodiments. The computing device 102 may include the port mux 108(1). The port mux 108(1) may be configured for a particular mode 1002(1), such as, for example, a single-ended signaling configuration (e.g., mode) or a differential signaling configuration. The computing device 102 may include one or more ports, including a USB-C compliant port 1002.

A port controller 1006(1) may determine (e.g., using the configuration channel pins) when a connector of a cable (e.g., the USB-C connector 132) has been inserted into the USB-C port 1004, the orientation (e.g., normal or flipped) of the cable, whether an alternate mode (e.g., vendor defined mode) is to be setup, and the like.

To connect the computing device 102 to the dock 106, the USB-C connector 132 (of the cable 104) is inserted into the USB-C port 1004 of the computing device 102 and a dock connector 140 is inserted into a dock port 1010 (of the dock 106). The dock connector 140 may be a USB connector, such as a USB-C connector, a proprietary connector, or another type of connector.

The cable 104 may include the USB-C connector 132, a paddleboard 1012 that includes a port controller 1006(2), the port mux 108(2), and the dock connector 140. The port mux 108(2) may be configured for a particular mode 1002(2), such as, for example, a single-ended signaling configuration (e.g., mode) or a differential signaling configuration.

After the USB-C connector 132 is inserted into the USB-C port 1004, the port controller 1006(1) detects (e.g., via the communication channel pins) that the cable 104 is connected to the computing device 102. The port controller 1006(1) in the computing device 102 and the port controller 1006(2) in the cable 104 may communicate with each other (e.g., via the communication channel) to determine the capabilities of the computing device 102 and the cable 104. Either or both of the port controllers 1006 may initiate a reconfiguration of the port muxes 108. For example, the port controller 1006(1) may determine (e.g., from the port controller 1006(2)) that the cable 104 includes the port mux 108(2) and send instructions 1012(1). The port controller 1006(2) may determine (e.g., from the port controller 1006(1)) that the computing device 102 includes the port mux 108(1) and send the instructions 1012(2) to the port mux 108(1) to change the mode 1002(1) to the single-ended signaling configuration. As another example, the port controller 1006(1) may determine (e.g., from the port controller 1006(2)) that the cable 104 includes the port mux 108(2), send instructions 1012(1) to the port mux 108(2) to change the mode 1002(2) to the single-ended signaling configuration, and send instructions 1012(2) to the port mux 108(2) to change the mode 1002(2) to the single-ended signaling configuration. As yet another example, the port controller 1006(2) may determine (e.g., from the port controller 1006(1)) that the computing device 102 includes the port mux 108(1), send the instructions 1012(2) to the port mux 108(2) to change the mode 1002(2) to the single-ended signaling configuration, and send the instructions 1012(1) the port mux 108(1) to change the mode 1002(1) to the single-ended signaling configuration. The instruction to select the single-ended signaling configuration may be sent to the port muxes 108 using an alternate mode, such as by using vendor defined messages.

The differential signaling configuration may be the default configuration for the port mux 108(1) and 108(2). The computing device 102 and the cable 104 may enter into the single-ended signaling configuration (e.g., mode) in response to detecting that (a) the computing device 102 includes the port mux 108(1) and (b) the cable 104 includes the port mux 108(2). For example, if the port controller 1006(1) determines that a cable connected to the computing device 102 does not include a port mux, then the port controller 1006(1) may instruct the port mux 108(1) to change to (or remain in) the differential signaling configuration. As another example, if the port controller 1006(2) determines that the cable 104 is connected to a computing device that does not include a port mux, then the port controller 1006(2) may instruct the port mux 108(2) to change to (or remain in) the differential signaling configuration.

The dock 106 may include one or more ports 1014, such as a USB2 compliant port, a USB3 compliant (e.g., USB 3.1 or higher) port, a Display Port compliant port, a PCIe compliant port, and the like. One or more devices, such as device 1016(1) to device 1016(N) (where N>0), may be connected to each of the ports 1014. The devices 106 may include storage devices, display devices (e.g., monitors, televisions, virtual reality glasses, or the like), and other types of peripheral devices.

Flowchart

Figure 11:
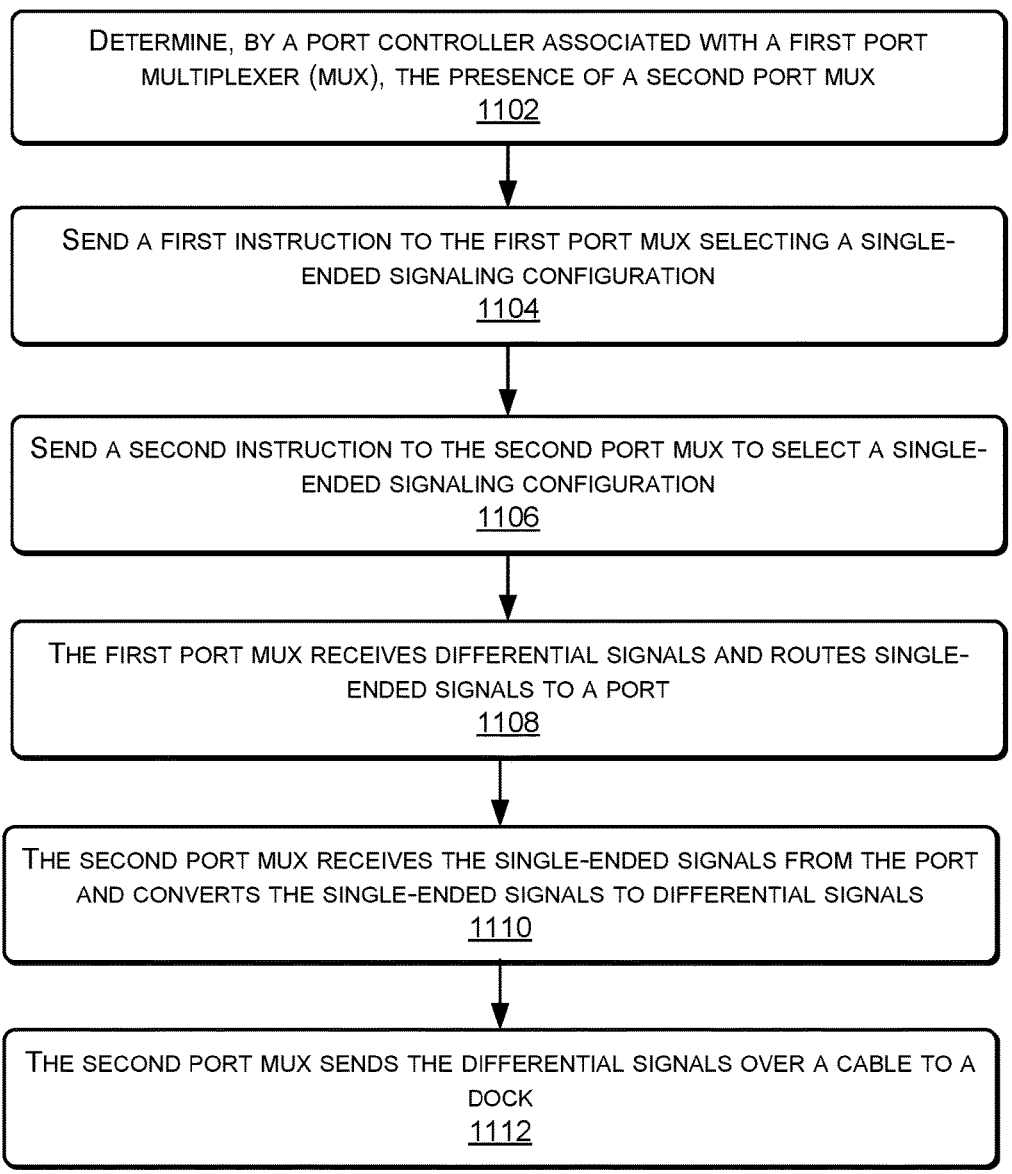
FIG. 11 is a flowchart of a process that includes sending an instruction to a port multiplexer according to some embodiments.

FIG. 11 is a flowchart of a process that includes sending an instruction to a port multiplexer according to some embodiments. The process may be performed by a port controller, such as the port controller 1006(1) or the port controller 1006(2) of FIG. 10.

At 1102, a port controller associated with a first port mux determines the presence of a second port mux. At 1104, the port controller sends a first instruction to the first port mux that selects a single-ended signaling configuration. At 1106, the port controller sends a second instruction to the second port mux that selects the single-ended signaling configuration. For example, in FIG. 10, after the USB-C connector 132 is inserted into the USB-C port 1004, the port controller 1006(1) detects (e.g., via the communication channel pins) that the cable 104 is connected to the computing device 102. The port controller 1006(1) in the computing device 102 and the port controller 1006(2) in the cable 104 communicate with each other (e.g., via the communication channel) to determine the capabilities of the computing device 102 and the cable 104. Either one of the port controllers 1006 may initiate a reconfiguration of the port muxes 108. For example, the port controller 1006(1) may determine (e.g., from the port controller 1006(2)) that the cable 104 includes the port mux 108(2), send instructions 1012(1) to the port mux 108(1) to change the mode 1002(1) to the single-ended signaling configuration, and send instructions 1012(2) to the port mux 108(2) to change the mode 1002(2) to the single-ended signaling configuration. As another example, the port controller 1006(2) may determine (e.g., from the port controller 1006(1)) that the computing device 102 includes the port mux 108(1), send the instructions 1012(2) to the port mux 108(2) to change the mode 1002(2) to the single-ended signaling configuration, and send the instructions 1012(1) the port mux 108(1) to change the mode 1002(1) to the single-ended signaling configuration.

At 1108, the first port mux receives differential signals and routes single-ended signals (from the differential signals) to a port. For example, in FIG. 2, the XPSW 220(1) may receive differential signals from DP channel A 202 and DP channel B 204 and route single-ended signals, e.g., by selecting and routing the positive signal from each differential pair, to the USB-C connector 132.

At 1110, the second port mux receives the single-ended signals from the port and converts the single-ended signals to differential signals. At 1112, the second port mux sends the differential signals over a cable to a dock. For example, in FIG. 2, the port mux 102(2) may receive the single-ended signals sent by the XPSW 220(1) via the USB-C connector 132, convert them to differential signals, and transmit the differential signals across the cable 104 to the dock 106.

Example Computing Device

Figure 12:
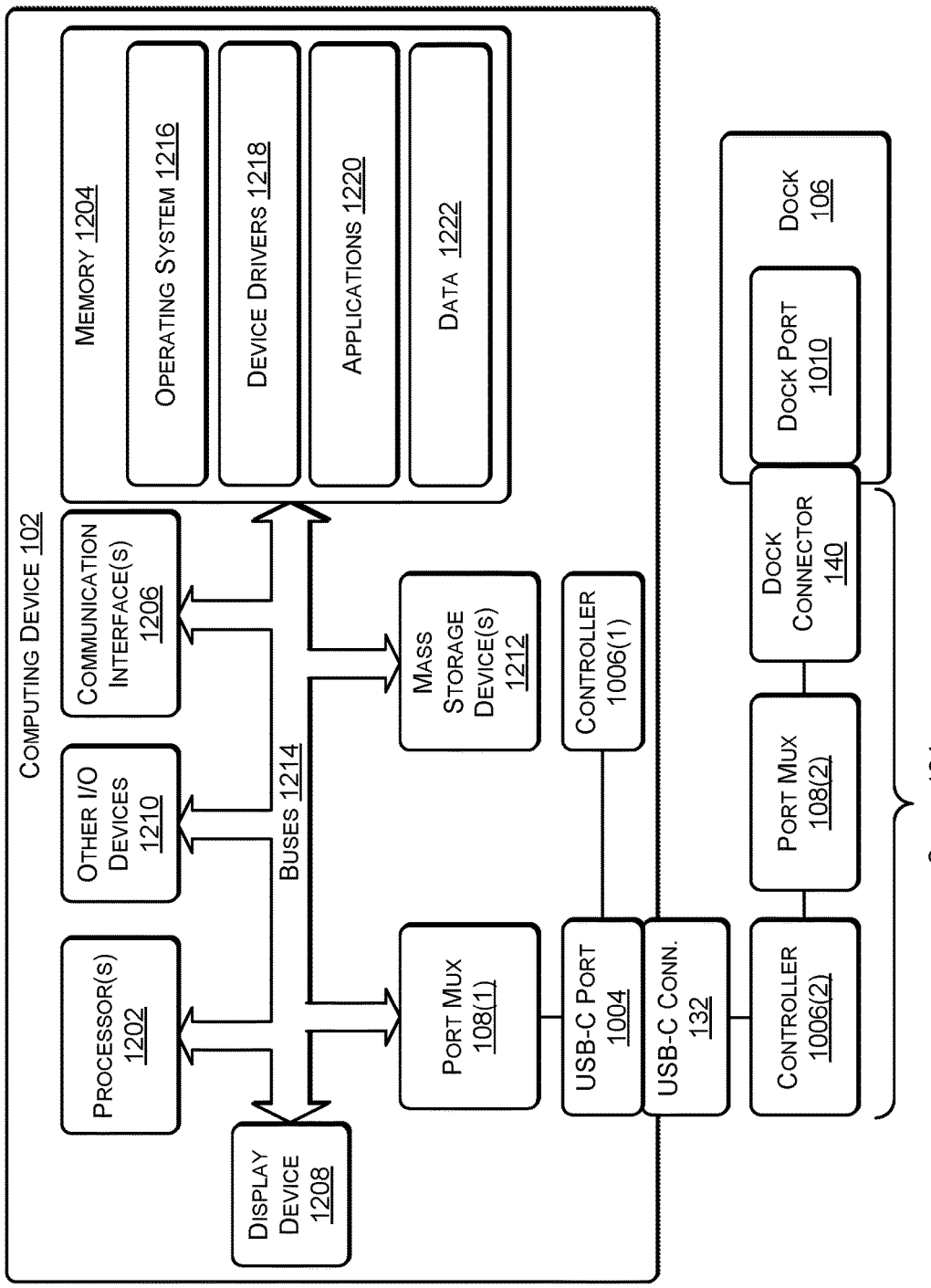
FIG. 12 illustrates an example configuration of a computing device that can be used to implement the systems and techniques described herein.

FIG. 12 illustrates an example configuration of the computing device 102 that can be used to implement the systems and techniques described herein. The computing device 102 may include one or more processors 1202, a memory 1204, communication interfaces 1206, a display device 1208, other input/output (I/O) devices 1210, and one or more mass storage devices 1212, configured to communicate with each other, such as via system buses 1214 or other suitable connection. The system buses 1214 may include multiple buses, such as memory device buses, storage device buses, power buses, video signal buses, and the like. A single bus is illustrated in FIG. 12 purely for ease of understanding.

The processors 1202 are one or more hardware devices that may include a single processing unit or a number of processing units, all of which may include single or multiple computing units or multiple cores. The processors 1202 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processor 1202 may be configured to fetch and execute computer-readable instructions stored in the memory 1204, mass storage devices 1212, or other computer-readable media.

Memory 1204 and mass storage devices 1212 are examples of computer storage media (e.g., memory storage devices) for storing instructions that can be executed by the processor 1202 to perform the various functions described herein. For example, memory 1204 may include both volatile memory and non-volatile memory (e.g., RAM, ROM, or the like) devices. Further, mass storage devices 1212 may include hard disk drives, solid-state drives, removable media, including external and removable drives, memory cards, flash memory, floppy disks, optical disks (e.g., CD, DVD), a storage array, a network attached storage, a storage area network, or the like. Both memory 1204 and mass storage devices 1212 may be collectively referred to as memory or computer storage media herein, and may be a media capable of storing computer-readable, processor-executable program instructions as computer program code that can be executed by the processor 1202 as a particular machine configured for carrying out the operations and functions described in the implementations herein.

The computing device 1200 may also include one or more communication interfaces 1206 for exchanging data via the network 118 with network elements 1216. The communication interfaces 1206 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1206 can also provide communication with external storage (not shown), such as in a storage array, network attached storage, storage area network, or the like. A display device 1208, such as a monitor may be included in some implementations for displaying information and images to users. Other I/O devices 1210 may be devices that receive various inputs from a user and provide various outputs to the user, and may include a keyboard, a remote controller, a mouse, a printer, audio input/output devices, and so forth.

The computer storage media, such as memory 1204 and mass storage devices 1212, may be used to store software and data. For example, the computer storage media may be used to store an operating system 1216, device drivers 1218, applications 1220, and data 1222.

The port controller 1006(1) may determine when the USB-C connector 132 has been connected to the USB-C port 1004, the orientation (e.g., normal or flipped) of the cable, whether an alternate mode (e.g., single-ended signaling mode) is to be configured, and the like. The USB-C connector 132 that is at one end of the cable 104 may be connected to the USB-C port 1004 of the computing device 102. The dock connector 140 that is at the other end of the cable 104 may be connected to the dock port 1010 of the dock 106. The dock connector 140 may be a USB connector, such as a USB-C connector, a proprietary connector, or another type of connector.

After the USB-C connector 132 is connected to the USB-C port 1004, the port controller 1006(1) detects (e.g., via the communication channel pins) that the cable 104 is connected to the computing device 102. The port controller 1006(1) in the computing device 102 and the port controller 1006(2) in the cable 104 may communicate with each other (e.g., via the communication channel) to determine the capabilities of the computing device 102 and the cable 104. For example, the port controller 1006(1) may determine that the cable 104 includes the port mux 108(2) and the port controller 1006(2) may determine that the computing device 102 include the port mux 108(1). In response, either one (or both) of the port controllers 1006 may initiate a reconfiguration of the port muxes 108. For example, the port controller 1006(1) may determine (e.g., from the port controller 1006(2)) that the cable 104 includes the port mux 108(2) and send instructions 1012(1) to the port mux 108(1) to change the mode 1002(1) to the single-ended signaling configuration. The port controller 1006(2) may determine (e.g., from the port controller 1006(1)) that the computing device 102 includes the port mux 108(1) and send the instructions 1012(2) to the port mux 108(2) to change the mode 1002(2) to the single-ended signaling configuration. The instruction to select the single-ended signaling configuration may be sent to the port muxes 108 using an alternate mode, such as by using vendor defined messages.

The differential signaling configuration may be the default configuration for the port mux 108(1) and 108(2). The computing device 102 and the cable 104 may enter into the single-ended signaling configuration (e.g., mode) in response to detecting that (a) the computing device 102 includes the port mux 108(1) and (b) the cable 104 includes the port mux 108(2). If the port controller 1006(1) determines that a cable connected to the computing device 102 does not include a port mux, then the port controller 1006(1) may instruct the port mux 108(1) to change to (or remain in) the differential signaling configuration. If the port controller 1006(2) determines that the cable 104 is connected to a computing device that does not include a port mux, then the port controller 1006(2) may instruct the port mux 108(2) to change to (or remain in) the differential signaling configuration.

In the single-ended signaling configuration, the port mux 108(1) receives differential signals (e.g., DP, USB, PCIe, MFDP, and the like), selects a single signal from each differential pair (e.g., the positive signal), and sends each of the single-ended signals through the USB-C port 1004 the USB-C connector 132 of the cable 104. The port mux 108(2) receives the single-ended signals, converts them into differential signal pairs (e.g., by inverting the single-ended signal to create a signal having the opposite polarity), and sends the differential signal pairs across the cable 104 to the dock 106.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining, by a computing device, that a connector of a cable has been connected to a port of the computing device, wherein the computing device includes a first port controller associated with a first port multiplexer;
    determining, by the computing device, that the cable includes a second port multiplexer;
    sending, by the computing device, a first instruction to the first port multiplexer to select a single-ended signaling configuration; and
    outputting, by the computing device, a plurality of single-ended signals to the port, wherein at least one of the first port multiplexer or the second port multiplexer include a crosspoint switch.

2. The method of claim 1, wherein outputting, by the computing device, the plurality of single-ended signals to the port comprises:
    identifying a plurality of differential pairs of signals;
    converting each differential pair of signals of the plurality of differential pairs of signals to a single-ended signal; and
    outputting the plurality of single-ended signals, wherein each single-ended signal of the plurality of single-ended signals corresponds to a particular differential pair of signals of the plurality of differential pairs of signals.

3. The method of claim 1, wherein:
    each single-ended signal in the plurality of single-ended signals is converted, by the second port multiplexer in the cable, to a second plurality of differential pairs of signals; and
    the second plurality of differential pairs of signals is sent to a dock that is connected to the cable.

4. The method of claim 1, wherein:
    the plurality of single-ended signals include:
        four lanes of a first DisplayPort channel;
        four lanes of a second DisplayPort channel; and
        a transmit channel and a receive channel that are compliant with universal serial bus (USB) 3.1 specification.

5. The method of claim 1, wherein:
    the plurality of single-ended signals comprise multi-function DisplayPort (MFDP) compliant signals.

6. The method of claim 1, wherein:
    the plurality of single-ended signals comprise four lanes of Peripheral Component Interconnect Express (PCIe) signals.

7. The method of claim 1, wherein:
    the first instruction comprises a vendor defined message (VDM).

8. A computing device comprising:
    one or more processors;
    one or more non-transitory computer-readable media storing instructions that are executable by the one or more processors;
    a first port multiplexer;
    a port;
    a first port controller configured to:
        determine that a connector of a cable has been connected to a port;
        determine that the cable includes a second port multiplexer;
        send a first instruction to the first port multiplexer to select a single-ended signaling configuration; and
    instruct the first port multiplexer to output a plurality of single-ended signals to the port wherein the plurality of single-ended signals enable provide up to 100 gigabits (Gbps) of throughput.

9. The computing device of claim 8, wherein, in the single-ended signaling configuration, the first port multiplexer is configured to:
    identify a plurality of differential pairs of signals; and
    output a positive polarity signal from each differential pair of the plurality of differential pairs of signals.

10. The computing device of claim 8, wherein the first port controller is further configured to:
    send a second instruction to the second port multiplexer to select the single-ended signaling configuration;
    wherein in the single-ended signaling configuration, each single-ended signal in the plurality of single-ended signals is converted, by the second port multiplexer, to a second plurality of differential pairs of signals; and
    the second plurality of differential pairs of signals is sent to a dock that is connected to the cable.

11. The computing device of claim 8, wherein:
    the plurality of single-ended signals include:
        four lanes of a first DisplayPort channel;
        four lanes of a second DisplayPort channel; and
        a transmit channel and a receive channel that are compliant with universal serial bus (USB) 3.1 specification.

12. The computing device of claim 8, wherein:
    the plurality of single-ended signals comprise multi-function DisplayPort (MFDP) compliant signals.

13. The computing device of claim 8, wherein:
    the plurality of single-ended signals comprise four lanes of Peripheral Component Interconnect Express (PCIe) signals.

14. The computing device of claim 8, wherein the first port controller is further configured to:
- determine that a second connector of a second cable has been inserted into the port;
- determine that the second cable excludes a port multiplexer; and
- send a third instruction to the first port multiplexer to select a differential signaling configuration.

15. A port controller configured to perform operations comprising:
- determining that a connector of a cable has been connected to a port of a computing device, wherein the computing device includes the port, the port controller, and a first port multiplexer;
- determining that the cable includes a second port multiplexer;
- sending a first instruction to the first port multiplexer to select a single-ended configuration; and
- sending a second instruction to the second port multiplexer to select the single-ended configuration;
- wherein, after selecting the single-ended configuration, the first port multiplexer receives a first plurality of differential signals and outputs to the port a second plurality of single-ended signals; and
- wherein at least one of the first port multiplexer or the second port multiplexer include a crosspoint switch.

16. The port controller of claim 15, wherein individual single-ended signals of the second plurality of single-ended signals correspond to a single signal derived from each differential pair of the first plurality of differential signals.

17. The port controller of claim 15, wherein the second port multiplexer in the cable:
- converts each single-ended signal in the second plurality of single-ended signals to a differential pair of signals; and
- sends the differential pair of signals to a dock that is connected to the cable.

18. The port controller of claim 15, wherein:
the second port multiplexer is located on a paddleboard of the cable.

19. The port controller of claim 15, wherein outputting to the port the second plurality of single-ended signals comprises:
- converting each differential pair of signals of the first plurality of differential signals to a single-ended signal; and
- outputting the second plurality of single-ended signals, wherein each single-ended signal of the second plurality of single-ended signals corresponds to a particular differential signals of the first plurality of differential signals.

20. The port controller of claim 15, wherein:
the second plurality of single-ended signals enable the port to provide up to 100 gigabits (Gbps) of throughput.

* * * * *